United States Patent
Shu et al.

(10) Patent No.: US 9,656,251 B2
(45) Date of Patent: May 23, 2017

(54) FULL-SI MOLECULAR SIEVE AND ITS SYNTHESIS PROCESS

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Xingtian Shu, Beijing (CN); Changjiu Xia, Beijing (CN); Min Lin, Beijing (CN); Bin Zhu, Beijing (CN); Xinxin Peng, Beijing (CN); Aiguo Zheng, Beijing (CN); Mudi Xin, Beijing (CN); Yanjuan Xiang, Beijing (CN); Chunfeng Shi, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 292 days.

(21) Appl. No.: 14/527,631

(22) Filed: Oct. 29, 2014

(65) Prior Publication Data

US 2015/0119569 A1   Apr. 30, 2015

(30) Foreign Application Priority Data

Oct. 29, 2013 (CN) .......................... 2013 1 0522051
Oct. 29, 2013 (CN) .......................... 2013 1 0522818
Oct. 29, 2013 (CN) .......................... 2013 1 0523015

(51) Int. Cl.
*B01J 29/40*   (2006.01)
*C01B 39/04*   (2006.01)
(Continued)

(52) U.S. Cl.
CPC .......... *B01J 29/0308* (2013.01); *B01J 29/40* (2013.01); *B01J 29/70* (2013.01); *B01J 29/7007* (2013.01);
(Continued)

(58) Field of Classification Search
CPC ....... B01J 29/40; B01J 29/7007; C01B 37/02; C01B 39/04; C01B 39/365; C01B 39/40
See application file for complete search history.

(56) References Cited

U.S. PATENT DOCUMENTS 4,061,724 A * 12/1977 Grose ................... B01J 20/103
423/335
4,073,865 A *  2/1978 Flanigen ................ B01D 53/02
423/335
(Continued)

FOREIGN PATENT DOCUMENTS

CN    1260241 A    7/2000
CN    1269360 A   10/2000
(Continued)

OTHER PUBLICATIONS

Barrett et al, "IKTQ-12: a new microporous silica polymorph potentially useful for light hydrocarbon separations", Chem. Commun. (2003), pp. 2114-2115.*
(Continued)

*Primary Examiner* — David M Brunsman
(74) *Attorney, Agent, or Firm* — Novick, Kim & Lee, PLLC; Allen Xue

(57) ABSTRACT

The present invention relates to a full-Si molecular sieve, wherein the full-Si molecular sieve has a $Q^4/Q^3$ of (10-90):1 wherein $Q^4$ is the peak strength at the chemical shift of $-112\pm2$ ppm in the $^{29}$Si NMR spectrum of the full-Si molecular sieve, expressed as the peak height relative to the base line; and $Q^3$ is the peak strength at the chemical shift
(Continued)

of −103±2 ppm in the $^{29}$Si NMR spectrum of the full-Si molecular sieve, expressed as the peak height relative to the base line.

51 Claims, 11 Drawing Sheets

(51) Int. Cl.
*B01J 29/70* (2006.01)
*B01J 29/03* (2006.01)
*C01B 39/36* (2006.01)
*C01B 39/40* (2006.01)
*C01B 37/02* (2006.01)

(52) U.S. Cl.
CPC .............. *C01B 37/02* (2013.01); *C01B 39/04* (2013.01); *C01B 39/365* (2013.01); *C01B 39/40* (2013.01)

(56) References Cited

U.S. PATENT DOCUMENTS

| | | | | |
|---|---|---|---|---|
| 4,410,501 A * | 10/1983 | Taramasso | ............... | B01J 29/89 423/705 |
| 2012/0016161 A1* | 1/2012 | Tsujiuchi | ................. | B01J 29/89 564/267 |
| 2012/0209029 A1* | 8/2012 | Chao | ........................ | B01J 29/89 564/267 |
| 2013/0041181 A1* | 2/2013 | Chen | .................... | C07C 249/04 564/267 |
| 2015/0119569 A1* | 4/2015 | Shu | .......................... | B01J 29/40 540/535 |

FOREIGN PATENT DOCUMENTS

| | | |
|---|---|---|
| CN | 1057976 C | 11/2000 |
| CN | 1338427 A | 3/2002 |
| CN | 101423225 A | 5/2009 |
| CN | 101429149 A | 5/2009 |
| CN | 101935052 A | 1/2011 |
| CN | 102120589 A | 7/2011 |
| CN | 101798088 B | 8/2011 |
| CN | 102432032 A | 5/2012 |
| CN | 102502687 A | 6/2012 |

OTHER PUBLICATIONS

Piccione et al, "Thermochemistry of Pure-Silica Zeolites", J. Phys. Chem. B, (2000) pp. 10001-10011.*
Alexander Aerts et al., "Investigation of the Mechanism of Colloidal Silicalite-1 Crystallization by Using DLS, SAXS, and 29Si NMR Spectroscopy", Chemistry European Journal, vol. 16, Jan. 13, 2010. pp. 2764-2774.
L. R. A. Follens et al., "Characterization of nanoparticles in diluted clear solutions for Silicate-1 zeolite synthesis using liquid 29Si NMP, SAXS and DLS", Physical Chemistry Chemical Physics, vol. 10, Jul. 23, 2008, pp. 5574-5583.

* cited by examiner

FULL-SI MOLECULAR SIEVE AND ITS SYNTHESIS PROCESS

TECHNICAL FIELD

The present invention relates to a full-Si molecular sieve and its synthesis.

BACKGROUND

The full-Si molecular sieves such as S-1, S-2 and beta molecular sieve have no exchangeable cation on the framework. Their adsorption capacities for water molecule are much lower than those for organic molecules, and therefore they are highly hydrophobic. The full-Si molecular sieve can be used as membrane separation material and catalytic material, and can also be used as matrix for producing other catalytic materials. For example, the full-Si molecular sieve with a MFI-structure (known as S-1, silicalite-1) has been used as the catalyst for producing caprolactam by rearranging cyclohexanone oxime. The research about incorporating the heteroatom to the full-Si molecular sieves S-1 and beta molecular sieve, such as the synthesis of the TS-1 molecular sieve and the Sn-beta molecular sieve is highly interested.

In the currently known direct hydrothermal synthesis of the full-Si molecular sieve, the organic silicon source and/or the inorganic silicon source are generally used. The organic silicon source such as the organic silicate TEOS is costly, and the molecular sieve made therefrom has a lower content of effective component. It is difficult to increase the solid content in the crystallization product in the synthesis of the molecular sieve. In addition, in the production of the molecular sieve, a large amount of ethanol is evaporated. It is difficult to collect and reuse the evaporated ethanol. In order to reduce the cost, the inorganic silicon source is used to partly or completely substitute the organic silicon source. However, the full-Si molecular sieve made from the inorganic silicon source has a low activity. In the synthesis of the full-Si molecular sieve, the organic quaternary ammonium base or salt is generally used as the template agent. Compared with the organic quaternary ammonium base, the organic quaternary ammonium salt is cheaper; however, the full-Si molecular sieve obtained by using the organic quaternary ammonium salt as the template agent has a low activity.

Prior Art 1: CN102120589A.
Prior Art 2: CN1057976C
Prior Art 3: U.S. Pat. No. 4,061,724A
Prior Art 4: U.S. Pat. No. 4,073,865A

SUMMARY OF THE INVENTION

Aim to the problem of the full-Si molecular sieve in the art, the present invention is to provide a new full-Si molecular sieve and its synthesis process.

The present invention provides a process for synthesizing a full-Si molecular sieve, comprising the following steps of
(1) a template agent, an organic silicon source, an inorganic amine source and water are mixed, and the resulting mixture is stirred at 0° C. to 150° C. e.g. at 0° C. to 100° C. for at least 10 minutes, e.g. for 10 minutes to 50 hours;
(2) the product obtained in the step (1) is aged, said aging is to keep the product obtained in the step (1) by standing at room temperature (e.g. 15° C. to 40° C.) for 1 hour to 60 hours, e.g. 2 hours to 50 hours, or 3 hours to 30 hours, or 3 hours to 15 hours;
(3) the aged product obtained in the step (2) and a solid silicon source are mixed homogenously, then the resulting mixture is subjected to crystallization in a close reaction vessel, and then the full-Si molecular sieve is collected;
wherein the molar ratio of the template agent, the total silicon source, the inorganic amine source and water is (0.04-0.5):1:(0.01-0.1):(3-100);
wherein the weight ratio of the aged product obtained in the step (2) (as $SiO_2$) to the solid silicon source (as $SiO_2$) is 1:(0.10-10);
wherein the total silicon source consists of the organic silicon source and the solid silicon source;
wherein the inorganic amine source can be an inorganic ammonium salt and/or aqueous ammonia.

The present invention also provides a process for synthesizing a full-Si molecular sieve, comprising the following steps of
(1) a template agent, an organic silicon source, an inorganic amine source and water are mixed, and the resulting mixture is stirred at 0° C. to 150° C. e.g. at 0° C. to 100° C. for at least 10 minutes, e.g. for 10 minutes to 50 hours, in order to hydrolyze the organic silicon source and reduce the content of alcohols formed by hydrolyzing the organic silicon source in the product;
(2) the product obtained in the step (1) is aged, said aging is to keep the product obtained in the step (1) by standing at room temperature (e.g. 15° C. to 40° C.) for 1 hour to 60 hours, e.g. 2 hours to 50 hours, or 3 hours to 30 hours, or 3 hours to 15 hours;
(3) the aged product obtained in the step (2) and a solid silicon source are mixed homogenously, then the resulting mixture is subjected to crystallization in a close reaction vessel, and then the full-Si molecular sieve is collected;
wherein the molar ratio of the template agent, the total silicon source, the inorganic amine source and water is (0.08-0.6):1:(0.01-0.1):(3-100);
wherein the weight ratio of the aged product obtained in the step (2) (as $SiO_2$) to the solid silicon source (as $SiO_2$) is 1:(0.10-10);
wherein the total silicon source consists of the organic silicon source and the solid silicon source;
wherein the inorganic amine source can be an inorganic ammonium salt and/or aqueous ammonia; the template agent is a mixture of an organic quaternary ammonium salt and an organic amine, wherein the molar ratio of the organic quaternary ammonium salt to the total silicon source is (0.04-0.55):1, and the molar ratio of the organic amine to the total silicon source is (0.04-0.45):1.

The present invention also provides a process for synthesizing a full-Si molecular sieve, which is a full-Si micropore and mesopore complex molecular sieve, comprising the following steps of:
(1) a template agent, an organic silicon source, an inorganic amine source and water are mixed, and the resulting mixture is stirred at 0° C. to 150° C. e.g. at 0° C. to 100° C. for at least 10 minutes, e.g. for 10 minutes to 50 hours;
(2) the product obtained in the step (1) is aged, said aging is to keep the product obtained in the step (1) by standing at room temperature (e.g. 15° C. to 40° C.) for 1 hour to 60 hours, e.g. 2 hours to 50 hours, or 3 hours to 30 hours, or 3 hours to 15 hours;
(3) the aged product obtained in the step (2) and a solid silicon source are mixed homogenously, then the resulting mixture is subjected to crystallization in a close reaction vessel, and then the full-Si molecular sieve is collected;
wherein the molar ratio of the template agent, the total silicon source, the inorganic amine source and water is;

wherein the weight ratio of the aged product obtained in the step (2) (as $SiO_2$) to the solid silicon source (as $SiO_2$) is 1:(0.10-10);
wherein the total silicon source consists of the organic silicon source and the solid silicon source;
wherein the inorganic amine source can be an inorganic ammonium salt and/or aqueous ammonia;
wherein the template agent can be a mixture of an organic quaternary ammonium compound, an organic amine and a long-chain alkyl ammonium compound, wherein the molar ratio of the organic amine to the total silicon source is (0.0-0.40):1, the molar ratio of the organic quaternary ammonium compound to the total silicon source is (0.04-0.45):1, the molar ratio of the long-chain alkyl ammonium compound to the total silicon source is (0.04-0.45):1;
preferably, in the template agent, the molar ratio of the organic base (selected from the organic quaternary ammonium base and the organic amine) to the total silicon source is not less than 0.04:1.

The present invention further provides a full-Si molecular sieve, characterized by that the full-Si molecular sieve has a $Q^4/Q^3$ of (10-90):1,
wherein $Q^4$ is the peak strength at the chemical shift of $-112\pm2$ ppm in the $^{29}Si$ NMR spectrum of the full-Si molecular sieve, expressed as the peak height relative to the base line;
$Q^3$ is the peak strength at the chemical shift of $-103\pm2$ ppm in the $^{29}Si$ NMR spectrum of the full-Si molecular sieve, expressed as the peak height relative to the base line.

The present invention further provides a full-Si micropore and mesopore complex molecular sieve, wherein the full-Si micropore and mesopore complex molecular sieve has not only a micropore structure, but also a mesopore structure. The pore diameter of said micropore is less than 1 nm, while the pore diameter of said mesopore is 2-8 nm. There are diffraction peaks at 2θ angles of 0-3° and 5-35° in the XRD spectrum of the full-Si micropore and mesopore complex molecular sieve. The diffraction peak at 2θ angle of 5-35° in the XRD spectrum of the molecular sieve demonstrates the presence of the micropore structure in the molecular sieve, and the diffraction peak at 2θ angle of 0-3° in the XRD spectrum of the molecular sieve demonstrates the presence of the mesopore structure in the molecular sieve. According to the full-Si micropore and mesopore complex molecular sieve of the present invention, and the micropore volume is 0.12-0.19 mL/g, and the mesopore volume is 0.3-0.8 mL/g. According to the present invention, the micropore volume means the volume of pores having a pore diameter being less than 1 nm; the mesopore volume means the volume of pores having a pore diameter of 2-8 nm.

The present invention further provides a process for producing caprolactam by re arranging cyclohexanone oxime, comprising the step of contacting cyclohexanone oxime with a full-Si molecular sieve, wherein the full-Si molecular sieve is the full-Si molecular sieve according to the present invention.

Specifically, the present invention provides the following technical solutions:

1. A full-Si molecular sieve, wherein the full-Si molecular sieve has a $Q^4/Q^3$ of (10-90):1, wherein $Q^4$ is the peak strength at the chemical shift of $-112\pm2$ ppm in the $^{29}Si$ NMR spectrum of the full-Si molecular sieve, expressed as the peak height relative to the base line; $Q^3$ is the peak strength at the chemical shift of $-103\pm2$ ppm in the $^{29}Si$ NMR spectrum of the full-Si molecular sieve, expressed as the peak height relative to the base line.

2. The full-Si molecular sieve according to any one of technical solutions 1-7 excluding itself, wherein the $Q^4/Q^3$ is (10-70):1 or (15-50):1 or (16-36):1.

3. The full-Si molecular sieve according to any one of technical solutions 1-7 excluding itself, wherein the full-Si molecular sieve has a crystal grain size of 200 nm-2 μm; the molecular sieve particle is a single crystal grain or an aggregate formed by multiple crystal grains.

4. The full-Si molecular sieve according to any one of technical solutions 1-7 excluding itself, wherein the full-Si molecular sieve is a S-1 molecular sieve (MFI), a S-2 molecular sieve (MEL) or a β molecular sieve (BEA).

5. The full-Si molecular sieve according to any one of technical solutions 1-7 excluding itself, wherein the crystal grain of the full-Si molecular sieve has a hollow structure, with a radial length of 5-300 nm for the cavity portion of the hollow grain, the adsorption capacity of benzene measured for the molecular sieve sample under the conditions of 25° C., P/P0=0.10 and 1 hour of adsorption time is at least 70 mg/g, and there is a hysteresis loop between the adsorption isotherm and the desorption isotherm for nitrogen adsorption by the molecular sieve at a low temperature.

6. The full-Si molecular sieve according to any one of technical solutions 1-7 excluding itself, wherein the full-Si molecular sieve has a micropore structure with a pore diameter being less than 1 nm and a mesopore structure with a pore diameter of 2-8 nm, the volume of pores having a pore diameter of 2-8 nm is 0.3-0.8 mL/g, the volume of pores having a pore diameter being less than 1 nm is 0.12-0.19 mL/g.

7. The full-Si molecular sieve according to any one of technical solutions 1-7 excluding itself, wherein (the volume of the mesopore with a pore diameter of 2-8 nm)/(the volume of the mesopore with a pore diameter of 2-8 nm plus the volume of the micropore with a pore diameter being less than 1 nm) is larger than 0.6 or larger than 0.7 and smaller than 0.8 or smaller than 0.75.

8. A process for synthesizing a full-Si molecular sieve, comprising the following steps of:
(1) a template agent, an organic silicon source, water and an inorganic amine source are mixed and subjected to hydrolyzation and removing alcohols;
(2) the product obtained in the step (1) is aged at 15-50° C.;
(3) the aged product obtained in the step (2) and a solid silicon source are mixed homogeneously, then subjected to crystallization in a close reaction vessel, and the full-Si molecular sieve is collected.

9. The process according to any one of technical solutions 8-39 excluding itself, wherein the template agent can be one or more of an organic quaternary ammonium base, an organic amine, an organic quaternary ammonium salt, and a long-chain alkyl ammonium compound, wherein the molar ratio of the organic quaternary ammonium base to the total silicon source is zero or (0.05-0.36):1; the molar ratio of the organic amine to the total silicon source is (0-0.45):1; the molar ratio of the organic quaternary ammonium salt to the total silicon source is (0-0.55):1; the molar ratio of the long-chain alkyl ammonium compound to the total silicon source is zero or (0.04-0.45):1;
preferably and optionally, when the content of the organic quaternary ammonium base is zero, neither the content of the organic amine nor the content of the organic quaternary ammonium salt are zero;
the organic silicon source is an organic silicate, which has a general formula of $Si(OR^1)_4$, $R^1$ is a linear or branched $C_1$-$C_6$ alkyl;

the solid silicon source is a high purity silica particle or powder, on a dry basis and by weight, the solid silicon source has a $SiO_2$ content of more than 99.99 wt %, a total content by atom of Fe, Al and Na of less than 10 ppm;

the inorganic amine source is an inorganic ammonium salt and/or aqueous ammonia.

10. The process according to any one of technical solutions 8-39 excluding itself, wherein the molar ratio of the template agent to the total silicon source (as $SiO_2$) is (0.04-0.60):1;

the molar ratio of water to the total silicon source (as $SiO_2$) is (3-100):1;

the molar ratio of the inorganic amine source (as $NH_4^+$) to the total silicon source (as $SiO_2$) is (0.01-0.1):1; and the weight ratio of the aged product (as $SiO_2$) to the solid silicon source (as $SiO_2$) is 1:(0.1-10).

11. The process according to any one of technical solutions 8-39 excluding itself, wherein the aging in the step (2) is conducted by keeping the product by standing at 15-50° C. for 1-60 hours.

12. The process according to any one of technical solutions 8-39 excluding itself, wherein in the step (3), the crystallization temperature is 110° C. to 200° C.; the crystallization pressure is an autogenous pressure; the crystallization time is 2 hours to 20 days.

13. The process according to any one of technical solutions 8-39 excluding itself, wherein in the step (1), the template agent is an organic quaternary ammonium base and/or an organic amine, and optionally an organic quaternary ammonium salt.

14. The process according to any one of technical solutions 8-39 excluding itself, wherein in the step (1), the template agent comprises an organic quaternary ammonium base and optionally an organic amine and/or an organic quaternary ammonium salt, wherein the molar ratio of the organic quaternary ammonium base to the total silicon source is (0.05-0.36):1; the molar ratio of the organic amine to the total silicon source is (0-0.45):1; the molar ratio of the organic quaternary ammonium salt to the total silicon source is (0-0.45):1.

15. The process according to any one of technical solutions 8-39 excluding itself, wherein in the step (1), the template agent is an organic quaternary ammonium base;

a mixture of an organic quaternary ammonium base and an organic amine;

a mixture of an organic quaternary ammonium base and an organic quaternary ammonium salt; or a mixture of an organic quaternary ammonium base, an organic amine and an organic quaternary ammonium salt.

16. The process according to any one of technical solutions 8-39 excluding itself, wherein in the step (1), the template agent is a mixture of an organic quaternary ammonium salt and an organic amine, wherein the molar ratio of the organic quaternary ammonium salt to the total silicon source is (0.04-0.55):1, and the molar ratio of the organic amine to the total silicon source is (0.04-0.45):1.

17. The process according to any one of technical solutions 8-39 excluding itself, wherein in the step (1), the template agent is a mixture of an organic quaternary ammonium salt and an organic amine, wherein the molar ratio of the organic quaternary ammonium salt to the total silicon source is (0.05-0.30):1, and the molar ratio of the organic amine to the total silicon source is (0.05-0.35):1.

18. The process according to any one of technical solutions 8-39 excluding itself, wherein in the step (1), the template agent is an organic quaternary ammonium base and/or an organic quaternary ammonium salt, an long-chain alkyl ammonium compound and an optional organic amine, the molar ratio of (the organic quaternary ammonium base and the organic quaternary ammonium salt) to the total silicon source is (0.04-0.45):1, the molar ratio of the long-chain alkyl ammonium compound to the total silicon source is (0.04-0.45):1, and the molar ratio of the organic amine to the total silicon source is (0-0.40):1.

19. The process according to any one of technical solutions 8-39 excluding itself, wherein in the step (1), the template agent is an organic quaternary ammonium base and/or an organic quaternary ammonium salt, a long-chain alkyl ammonium compound and an optional organic amine, the molar ratio of (the organic quaternary ammonium base and the organic quaternary ammonium salt) to the total silicon source is (0.05-0.30):1, the molar ratio of the organic amine to the total silicon source is (0-0.40):1, and the molar ratio of the long-chain alkyl ammonium compound to the total silicon source is (0.05-0.30):1.

20. The process according to any one of technical solutions 8-39 excluding itself, wherein in the step (1), the template agent is an organic quaternary ammonium base and/or an organic quaternary ammonium salt, a long-chain alkyl ammonium compound and an organic amine, the molar ratio of (the organic quaternary ammonium base and the organic quaternary ammonium salt) to the total silicon source is (0.05-0.20):1, the molar ratio of the organic amine to the total silicon source is (0.05-0.25):1, and the molar ratio of the long-chain alkyl ammonium compound to the total silicon source is (0.05-0.25):1.

21. The process according to any one of technical solutions 8-39 excluding itself, wherein the full-Si molecular sieve is a S-1 molecular sieve, wherein the template agent is one or more of tetrapropylammonium hydroxide, tetrapropylammonium chloride and tetrapropylammonium bromide, and optionally the organic amine and/or the long-chain alkyl ammonium compound; or, the full-Si molecular sieve is a S-2 molecular sieve, wherein the template agent is one or more of tetrabutylammonium hydroxide, tetrabutylammonium chloride and tetrabutylammonium bromide, and optionally an organic amine and/or a long-chain alkyl ammonium compound; or, the full-Si molecular sieve is a 0 molecular sieve, and the template agent is one or more of tetraethylammonium hydroxide, tetraethylammonium chloride and tetraethylammonium bromide, and optionally the organic amine and/or the long-chain alkyl ammonium compound.

22. The process according to any one of technical solutions 8-39 excluding itself, wherein said process further comprises a step (4): the full-Si molecular sieve obtained in the step (3) is subjected to crystallization in an organic base solution, and then the full-Si molecular sieve is collected, the crystallization temperature is 100° C. to 200° C., or 100° C. to 150° C., or 120° C. to 200° C., or 150° C. to 200° C., the crystallization time is 0.1 day to 10 days, or 0.5 day to 10 days, or 0.5 day to 8 days, or 0.5 day to 6 days, or 1 day to 6 days.

in the step (4), the molar ratio of the full-Si molecular sieve to the organic base is 1:(0.02-0.5), or 1:(0.02-0.2), the molar ratio of the full-Si molecular sieve to water is 1:(2-50), 1:(2-30), 1:(2-20), or 1:(5-10).

23. The process according to any one of technical solutions 8-39 excluding itself, wherein the solid silicon source is carbon white having a specific surface area of 50-400 $m^2/g$.

24. The process according to any one of technical solutions 8-39 excluding itself, wherein the molar ratio of the template agent to the total silicon source (as $SiO_2$) is (0.05-0.36):1; (0.05-0.25):1; (0.05-0.20):1; (0.10-0.55):1; (0.10-0.36):1; (0.10-0.25):1; (0.08-0.60):1; or (0.10-0.5):1.

25. The process according to any one of technical solutions 8-39 excluding itself, wherein the molar ratio of the inorganic amine source (as $NH_4^+$) to the total silicon source (as $SiO_2$) is (0.01-0.1):1; (0.01-0.07):1; (0.01-0.05):1; (0.02-0.05):1;

26. The process according to any one of technical solutions 8-39 excluding itself, wherein the molar ratio of water to the total silicon source (as $SiO_2$) is (5-80):1; (6-50):1; (6-30):1; (6-20):1; (5-100):1; (5-50):1; or (3-100):1;

27. The process according to any one of technical solutions 8-39 excluding itself, wherein the weight ratio of the aged product (as $SiO_2$) to the solid silicon source (as $SiO_2$) is 1:(1-9) or 1:(2-8).

28. The process according to any one of technical solutions 8-39 excluding itself, wherein the organic quaternary ammonium base can be one or more of tetrapropylammonium hydroxide (TPAOH), tetrabutylammonium hydroxide (TBAOH) and tetraethylammonium hydroxide (TEAOH);

the organic amine can be one or more of aliphatic amine, aromatic amine and alcoholic amine;

the aliphatic amine can have a general formula of $R^3(NH_2)_n$, wherein $R^3$ is $C_{1-4}$alkyl or $C_{1-4}$alkylene, n is 1 or 2; for example, one or more of ethylamine, n-butylamine, butylene diamine and hexamethylene diamine;

the alcoholic amine can have a general formula of $(HOR^4)_m NH_{(3-m)}$, wherein R4 is $C_1$-$C_4$alkyl, m is 1, 2 or 3; for example, one or more of monoethanolamine, diethanolamine and triethanolamine;

the aromatic amine can be one or more of aniline, amino toluene and p-phenylene diamine;

the organic quaternary ammonium salt can be one or more of tetrapropylammonium bromide, tetrabutylammonium bromide, tetraethylammonium bromide, tetrapropylammonium chloride, tetrabutylammonium chloride and tetraethylammonium chloride;

the long-chain alkyl ammonium compound can have a formula of $R^5NH_3X$ or $R^5N(R^6)_3X$, wherein $R^5$ is a $C_{12}$-$C_{18}$ alkyl, $R^6$ is a $C_1$-$C_6$ (e.g. $C_1$-$C_4$)alkyl, wherein three $R^6$s in $R^5N(R^6)_3X$ can be identical or not; X is a monovalent anion, e.g. $OH^-$, $Cl^-$, $Br^-$; for example, one or more of the long-chain alkyl trimethyl ammonium chloride, long-chain alkyl trimethyl ammonium bromide, long-chain alkyl trimethyl ammonium hydroxide; for example, cetyltrimethylammonium bromide (CTMAB), cetyltrimethylammonium chloride, cetyltrimethylammonium hydroxide (MSDS), the long-chain alkyl ammonium compound is one or more of myristyltrimethylammonium bromide (TTAB), myristyltrimethylammonium chloride, myristyltrimethylammonium hydroxide, dodecyltrimethylammonium bromide (DTAB), dodecyltrimethylammonium chloride, dodecyltrimethylammonium hydroxide, octadecyltrimethylammonium bromide, octadecyltrimethylammonium chloride, octadecyltrimethylammonium hydroxide.

29. The process according to any one of technical solutions 8-39 excluding itself, wherein in the step (1), the time for hydrolyzation and removing alcohols is at least 10 minutes, e.g. 2-30 hours.

30. The process according to any one of technical solutions 8-39 excluding itself, wherein in the step (1), the temperature for hydrolyzation and removing alcohols is 0° C. to 150° C., e.g. 50-95° C. or 50-90° C.

31. The process according to any one of technical solutions 8-39 excluding itself, wherein in the mixture obtained in the step (1), the weight content of alcohols produced by hydrolyzation of the organic silicon source is not higher than 10 ppm.

32. The process according to any one of technical solutions 8-39 excluding itself, wherein in the step (2), the aging time is 2 hours to 50 hours, or 3 hours to 30 hours, or 3 hours to 15 hours, or 1 hour to 60 hours.

33. The process according to any one of technical solutions 8-39 excluding itself, wherein in the step (2), the aging temperature is room temperature to 50° C., or 15° C. to 30° C., or 15° C. to 26° C., or 26° C. to 30° C.

34. The process according to any one of technical solutions 8-39 excluding itself, wherein in the step (3), the crystallization temperature is 110° C. to 200° C., 140° C. to 180° C., or 160° C. to 180° C.

35. The process according to any one of technical solutions 8-39 excluding itself, wherein in the step (3), the crystallization time is 2 hours to 20 days, 0.5 day to 20 days, 0.5 day to 10 days, or 1 day to 6 days, or 0.5 day to 6 days, or 0.5 day to 3 days, or 1 day to 3 days.

36. The process according to any one of technical solutions 8-39 excluding itself, wherein in the step (3), the crystallization pressure is an autogenous pressure.

37. The process according to any one of technical solutions 8-39 excluding itself, wherein in the step (3), the crystallization is conducted under the following conditions: the crystallization is performed at 100° C. to 130° C., e.g. at 110° C. to 130° C. for 0.5 day to 1.5 days, and then at 160° C. to 180° C. for 1 day to 3 days, the crystallization pressure is an autogenous pressure.

38. The process according to any one of technical solutions 8-39 excluding itself, wherein the organic silicate is tetramethyl orthosilicate, tetraethyl orthosilicate, tetrabutyl orthosilicate, dimethyl diethyl orthosilicateone or more of.

39. A process for producing caprolactam by rearranging cyclohexanone oxime, comprising the step of contacting cyclohexanone oxime with the full-Si molecular sieve according to any one of technical solutions 1-7.

ILLUSTRATION OF DRAWINGS

DETAILED DESCRIPTION

Figure 1:
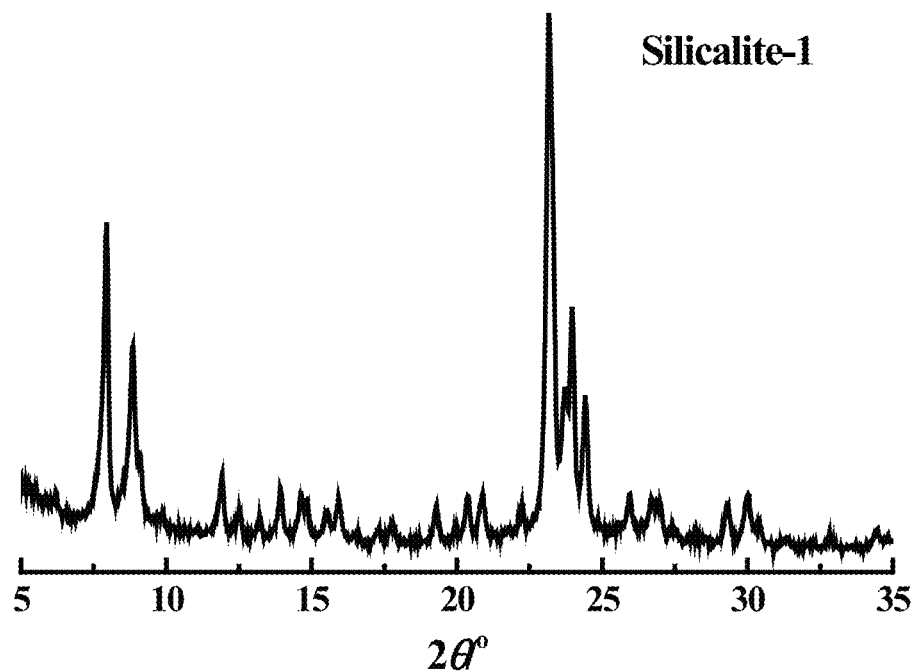
FIG. 1 is an XRD spectrum of S-1 molecular sieve, which is synthesized according to the present invention.

According to the present invention,
when a ratio involves the total silicon source, the organic silicon source, the solid silicon source (also called the inorganic silicon source), and the aged product, the ratio is calculated as $SiO_2$, unless indicated to the contrary;
when a ratio involves the inorganic amine source, the inorganic ammonium salt and the aqueous ammonia, the ratio is calculated as $NH_4^+$, unless indicated to the contrary; when a ratio involves water, said ratio is calculated as $H_2O$, unless indicated to the contrary.

In the full-Si molecular sieve, one silicon atom is connected to other four silicon atoms via oxygen, which can be expressed as $Si(OSi)_4$ and show a peak at chemical shift of $-112\pm2$ ppm in the $^{29}Si$ NMR spectrum, the strength of which, expressed as the peak height relative to the base line, is referred to as $Q^4$; one silicon atom is connected to other three silicon atoms via oxygen, which can be expressed as $SiOH(OSi)_3$ and show a peak at chemical shift of $-103\pm2$ ppm in the $^{29}Si$ NMR spectrum, the strength of which, expressed as the peak height relative to the base line, is referred to as $Q^3$. The $Q^4/Q^3$ reflects the amount of defect sites. The more the $Q^4/Q^3$ is, the smaller the number of defect sites is. The known full-Si molecular sieve has a $Q^4/Q^3$ of >95.

The full-Si molecular sieve according to the present invention has more silicon defect sites connecting three silicon atoms in the lattice, and has higher catalytic activity in the Beckman rearrangement of cyclohexanone oxime.

The process for synthesizing the full-Si molecular sieve according to the present invention can produce the full-Si molecular sieve of the present invention. The produced molecular sieve has more defect sites.

Furthermore, in the process for synthesizing the full-Si molecular sieve according to the present invention, the cheap and readily available solid silicon source such as high purity silica gel and/or carbon white can be used to partly or completely substitute the costly organic silicon source, and/or the organic quaternary ammonium salt is used to substitute the organic quaternary ammonium base, the waste emission in the production of the molecular sieve can be lowered and the cost of raw materials can be reduced.

In the process for synthesizing the full-Si molecular sieve according to the present invention, the crystal grain size of the prepared full-Si molecular sieve can be expediently adjusted by altering the synthesis condition, e.g. the ratio of the solid silicon source to the organic silicon source, and a full-Si molecular sieve, having a crystal grain size comparable to or even smaller than those prepared according to the prior art in which the organic silicon material is used as the only silicon source, can be obtained.

In the process for synthesizing the full-Si molecular sieve according to the present invention, the organic quaternary ammonium salt, rather than the organic quaternary ammonium base, can be used as the template agent to produce the full-Si molecular sieve. The obtained molecular sieve has a smaller crystal grain size and a higher activity than those prepared according to the prior art by using the organic quaternary ammonium salt.

In the process for synthesizing the full-Si molecular sieve according to the present invention, the full-Si molecular sieve can be produced at a lower used amount of the template agent and at a lower ratio of water to the total silicon source. The cost for synthesizing the full-Si molecular sieve can be sharply reduced, the solid content in the crystallization product in the synthesis of the molecular sieve can be increased, and the single-vessel molecular sieve output can be increased.

The present invention further provides a process for producing caprolactam by rearranging cyclohexanone oxime, comprising the step of contacting cyclohexanone oxime with a full-Si molecular sieve, wherein the full-Si molecular sieve is the full-Si molecular sieve according to the present invention. The condition for contacting cyclohexanone oxime with the full-Si molecular sieve can be those commonly used in the convention production of caprolactam by contacting cyclohexanone oxime with the full-Si molecular sieve, for example, those disclosed in CN101429149A and CN1269360A, or those disclosed in other methods for synthesizing caprolactam with the full-Si molecular sieve in the prior art.

In the process for synthesizing the full-Si molecular sieve according to the present invention, the full-Si molecular sieve can be synthesized at a lower used amount of the template agent. For example, the molar ratio of the template agent to the organic silicon source can be (0.05-0.36):1, or (0.05-0.25):1, e.g. (0.05-0.2):1, or (0.10-0.36):1, or (0.10-0.25):1 or (0.10-0.2):1.

In the process for synthesizing the full-Si molecular sieve according to the present invention, the full-Si molecular sieve can be synthesized at a higher solid content, so that the used amount of water can be reduced, and the single-vessel output can be increased (i.e. under the same reactor volume, more molecular sieve can be produced in a single synthesis). Therefore, the molar ratio of water to the total silicon source can be lower, e.g. (5-80):1, or (5-50):1, or (6-30):1, or (6-20):1.

Material

In a process for synthesizing the full-Si molecular sieve, the used material comprises the template agent, the total silicon source, the inorganic amine source and water. The total silicon source refers to a combination of the organic silicon source and the inorganic silicon source, the inorganic silicon source is also called as the solid silicon source.

In an embodiment, the molar ratio of the template agent, total silicon source, the inorganic amine source and water can be (0.05-0.36):1:(0.01-0.1):(5-80).

In an embodiment, the molar ratio of the template agent, total silicon source, the inorganic amine source and water can be (0.05-0.25):1:(0.01-0.07):(6-50).

In an embodiment, the molar ratio of the template agent, total silicon source, the inorganic amine source and water can be (0.05-0.25):1:(0.01-0.07):(6-30).

In an embodiment, the molar ratio of the template agent, total silicon source, the inorganic amine source and water can be (0.05-0.25):1:(0.01-0.05):(6-20).

In an embodiment, the molar ratio of the template agent, total silicon source, the inorganic amine source and water can be (0.10-0.55):1:(0.01-0.1):(5-100).

In an embodiment, the molar ratio of the template agent, total silicon source, the inorganic amine source and water can be (0.10-0.36):1:(0.01-0.1):(5-80).

In an embodiment, the molar ratio of the template agent, total silicon source, the inorganic amine source and water can be (0.10-0.36):1:(0.01-0.1):(5-50).

In an embodiment, the molar ratio of the template agent, total silicon source, the inorganic amine source and water can be (0.10-0.25):1:(0.01-0.07):(6-30).

In an embodiment, the molar ratio of the template agent, total silicon source, the inorganic amine source and water can be (0.08-0.6):1:(0.01-0.1):(3-100).

In an embodiment, the molar ratio of the template agent, total silicon source, the inorganic amine source and water can be (0.10-0.5):1:(0.01-0.1):(5-80).

In an embodiment, the molar ratio of the template agent, total silicon source, the inorganic amine source and water can be (0.10-0.36):1:(0.01-0.07):(6-50).

In an embodiment, the molar ratio of the template agent, total silicon source, the inorganic amine source and water can be (0.10-0.25):1:(0.02-0.05):(6-30).

In an embodiment, the molar ratio of the template agent to the total silicon source can be (0.05-0.2):1.

In an embodiment, the molar ratio of the template agent to the total silicon source can be (0.10-0.25):1.

In an embodiment, the molar ratio of the template agent to the total silicon source can be (0.10-0.20):1.

In an embodiment, the molar ratio of water to the total silicon source can be (6-20):1.

In an embodiment, the molar ratio of the inorganic amine source to the total silicon source can be (0.01-0.07):1.

In an embodiment, the molar ratio of the inorganic amine source to the total silicon source can be (0.01-0.05):1.

Template Agent

The template agent can be an organic base, or can be an organic base and an organic quaternary ammonium salt. For example, the template agent can be an organic quaternary ammonium base, or can be a mixture of an organic quaternary ammonium base and an organic amine, or can be a mixture of an organic quaternary ammonium base and an organic quaternary ammonium salt, or can be a mixture of an organic amine and an organic quaternary ammonium salt, or can be a mixture of an organic quaternary ammonium base, an organic quaternary ammonium salt and an organic amine. The template agent can further include a long-chain alkyl ammonium compound. For example, the template agent can comprise an organic quaternary ammonium compound, a long-chain alkyl ammonium compound and an optional organic amine compound. The organic base can be one or more of an organic quaternary ammonium base and an organic amine. The organic amine can be one or more of an aliphatic amine, an aromatic amine and an alcoholic amine. The aliphatic amine can have a general formula of $R^3(NH_2)_n$, wherein $R^3$ is $C_{1-4}$alkyl or $C_{1-4}$alkylene, n is 1 or 2. The aliphatic amine can be one or more of ethylamine, n-butylamine, butylene diamine and hexamethylene diamine. The alcoholic amine can have a general formula of $(HOR^4)_mNH_{(3-m)}$, wherein $R^4$ is $C_1$-$C_4$alkyl, m is 1, 2 or 3. The alcoholic amine can be one or more of monoethanolamine, diethanolamine and triethanolamine. The aromatic amine refers to an amine having an aromatic substituent, and can be one or more of aniline, amino toluene and p-phenylene diamine. The organic quaternary ammonium compound can have a general formula of $R^7{}_4NX^7$, wherein $R^7$ is $C_1$, $C_2$, $C_3$, $C_4$, $C_5$ or $C_6$-alkyl, $X^7$ is a monovalent anion, e.g. OH—, Cl— or Br—. The organic quaternary ammonium compound is an organic quaternary ammonium base and/or an organic quaternary ammonium salt.

According to the present invention, the organic quaternary ammonium base can be one or more of tetrapropylammonium hydroxide (TPAOH), tetrabutylammonium hydroxide (TBAOH) and tetraethylammonium hydroxide (TEAOH).

According to the present invention, the organic quaternary ammonium salt can be one or more of tetrapropylammonium bromide, tetrabutylammonium bromide, tetraethylammonium bromide, tetrapropylammonium chloride, tetrabutylammonium chloride and tetraethylammonium chloride.

The long-chain alkyl ammonium compound can have a general formula of $R^5NH_3X$ or $R^5N(R^6)_3X$, wherein $R^5$ is a $C_{12}$-$C_{18}$alkyl, $R^6$ is $C_1$-$C_6$alkyl, e.g. methyl, ethyl, propyl, butyl, pentyl or hexyl, wherein three $R^6$s in $R^5N(R^6)3X$ can be identical or not; X is a monovalent anion, e.g. OH$^-$, Cl$^-$, Br$^-$. According to the present invention, the long-chain alkyl refers to $C_{12}$-$C_{18}$alkyl.

The long-chain alkyl ammonium compound for example is one or more of a long-chain alkyl trimethyl ammonium chloride, a long-chain alkyl trimethyl ammonium bromide, a long-chain alkyl trimethyl ammonium hydroxide. The long-chain alkyl ammonium compound for example is one or more of cetyltrimethylammonium bromide (CTMAB), cetyltrimethylammonium chloride, cetyltrimethylammonium hydroxide (MSDS), myristyltrimethylammonium bromide (TTAB), myristyltrimethylammonium chloride, myristyltrimethylammonium hydroxide, dodecyltrimethylammonium bromide (DTAB), dodecyltrimethylammonium chloride, dodecyltrimethylammonium hydroxide, octadecyltrimethylammonium bromide, octadecyltrimethylammonium chloride, and octadecyltrimethylammonium hydroxide.

In an embodiment, the template agent can comprise an organic quaternary ammonium base. For example, the template agent can be an organic quaternary ammonium base, or can be a mixture containing an organic quaternary ammonium base. For example, the template agent can be a mixture of an organic quaternary ammonium base and an organic amine, or can be a mixture of an organic quaternary ammonium base and an organic quaternary ammonium salt, or can be a mixture of an organic quaternary ammonium base, an organic quaternary ammonium salt and an organic amine.

In an embodiment, the molar ratio of the organic quaternary ammonium base to the total silicon source can be (0.05-0.36):1.

In an embodiment, the molar ratio of the organic quaternary ammonium base to the total silicon source can be (0.05-0.2):1.

In an embodiment, the molar ratio of the organic amine to the total silicon source can be (0-0.45):1.

In an embodiment, the molar ratio of the organic amine to the total silicon source can be (0-0.35):1.

In an embodiment, the molar ratio of the organic amine to the total silicon source can be (0.05-0.25):1.

In an embodiment, the molar ratio of the organic quaternary ammonium salt to the total silicon source can be (0-0.45):1.

In an embodiment, the molar ratio of the organic quaternary ammonium salt to the total silicon source can be (0.05-0.3):1.

In an embodiment, the template agent can comprise an organic base, wherein the organic base is an organic quaternary ammonium base and/or an organic amine.

In an embodiment, the molar ratio of the organic base to the total silicon source can be not less than 0.04:1.

In an embodiment, the molar ratio of the organic base to the total silicon source can be not less than 0.05:1.

In an embodiment, the molar ratio of the organic base to the total silicon source can be (0.05-0.45):1.

In an embodiment, the template agent can comprise an organic base, wherein the organic base is one or more of an organic quaternary ammonium base, a long-chain alkyl ammonium hydroxide and an organic amine.

In an embodiment, the molar ratio of the organic base to the total silicon source can be not less than 0.04:1.

In an embodiment, the molar ratio of the organic base to the total silicon source can be not less than 0.05:1.

In an embodiment, the molar ratio of the organic base to the total silicon source can be (0.05-0.45):1.

In an embodiment, the template agent can comprise an organic quaternary ammonium compound, wherein the organic quaternary ammonium compound is an organic quaternary ammonium base and/or an organic quaternary ammonium salt.

In an embodiment, the molar ratio of the organic quaternary ammonium compound to the total silicon source can be not less than 0.05:1.

In an embodiment, the molar ratio of the organic quaternary ammonium compound to the total silicon source can be (0.05-0.45):1.

In an embodiment, the molar ratio of the organic quaternary ammonium compound to the total silicon source can be (0.05-0.30):1.

In an embodiment, the molar ratio of the organic quaternary ammonium compound to the total silicon source can be (0.05-0.25):1.

In an embodiment, the molar ratio of the organic quaternary ammonium compound to the total silicon source can be (0.05-0.20):1.

In an embodiment, the template agent is an organic quaternary ammonium salt and an organic amine.

In an embodiment, the molar ratio of the organic quaternary ammonium salt to the total silicon source can be (0.05-0.3):1.

In an embodiment, the molar ratio of the organic quaternary ammonium salt to the total silicon source can be (0.05-0.2):1.

In an embodiment, the molar ratio of the organic amine to the total silicon source can be (0.05-0.45):1.

In an embodiment, the molar ratio of the organic amine to the total silicon source can be (0.05-0.40):1.

In an embodiment, the molar ratio of the organic amine to the total silicon source can be (0.05-0.35):1.

In an embodiment, the molar ratio of the organic amine to the total silicon source can be (0.05-0.30):1.

In an embodiment, the molar ratio of the organic amine to the total silicon source can be (0.10-0.25):1.

In an embodiment, the molar ratio of the organic amine to the total silicon source can be (0-0.40):1

In an embodiment, the template agent can comprise an organic quaternary ammonium salt and an organic amine.

In an embodiment, the molar ratio of the organic quaternary ammonium salt to the total silicon source can be (0.05-0.3):1.

In an embodiment, the molar ratio of the organic quaternary ammonium salt to the total silicon source can be (0.05-0.2):1.

In an embodiment, the molar ratio of the organic amine to the total silicon source can be (0.05-0.45):1.

In an embodiment, the molar ratio of the organic amine to the total silicon source can be (0.05-0.40):1.

In an embodiment, the molar ratio of the organic amine to the total silicon source can be (0.05-0.35):1.

In an embodiment, the molar ratio of the organic amine to the total silicon source can be (0.05-0.30):1.

In an embodiment, the molar ratio of the organic amine to the total silicon source can be (0.10-0.25):1.

In an embodiment, the molar ratio of the organic amine to the total silicon source can be (0-0.40):1.

In an embodiment, the template agent can comprise a long-chain alkyl ammonium compound.

In an embodiment, the molar ratio of the long-chain alkyl ammonium compound to the total silicon source can be (0.05-0.40):1.

In an embodiment, the molar ratio of the long-chain alkyl ammonium compound to the total silicon source can be (0.05-0.35):1.

In an embodiment, the molar ratio of the long-chain alkyl ammonium compound to the total silicon source can be (0.05-0.25):1.

In an embodiment, the template agent can comprise an organic quaternary ammonium compound and a long-chain alkyl ammonium compound, and optionally an organic amine compound, wherein the molar ratio of the organic quaternary ammonium compound to the total silicon source can be (0.04-0.45):1, the molar ratio of the long-chain alkyl ammonium compound to the total silicon source can be (0.04-0.45):1, the molar ratio of the organic amine to the total silicon source can be (0-0.4):1.

Total Silicon Source

According to the present invention, the total silicon source is a combination of the organic silicon source and the inorganic silicon source (also called as the solid silicon source).

According to the present invention, the organic silicon source can be an organic silicate.

The organic silicate can have a general formula of $Si(OR^1)_4$, $R^1$ can be $C_1$-$C_6$alkyl, e.g. $R^1$ can be $C_1$-$C_4$alkyl, said alkyl is linear or branched.

The organic silicate can be one or more of tetramethyl orthosilicate, tetraethyl orthosilicate, tetrabutyl orthosilicate, dimethyl diethyl orthosilicate.

Among other, the preferable is one or more of tetramethyl orthosilicate, tetraethyl orthosilicate, dimethyl diethyl orthosilicate.

According to the present invention, the solid silicon source can be high purity silica solid or powder.

In an embodiment, on a dry basis and by weight, the solid silicon source has a $SiO_2$ content of not less than 99.99 wt %, and a total weight content of Fe, Al and Na by atom of less than 10 ppm.

In an embodiment, on a dry basis and by weight, the solid silicon source has a $SiO_2$ content of 99.99 wt % to 100 wt %, generally more than 99.99 wt % and less than 100 wt %.

In an embodiment, the solid silicon source can be carbon white and/or high purity silica gel.

In an embodiment, on a dry basis and by weight, said high purity silica gel can have a $SiO_2$ content of not less than 99.99 wt %, for example, more than 99.99 wt % and less than 100 wt %, and a total weight content of Fe, Al and Na by atom of less than 10 ppm.

In an embodiment, on a dry basis and by weight, the carbon white can have a $SiO_2$ content of not less than 99.99 wt %, for example, 99.99 wt % to 100 wt %, or, more than 99.99 wt % and less than 100 wt %, and a total weight content of Fe, Al and Na by atom of less than 10 ppm.

In an embodiment, the carbon white can have a specific surface area of $(50-400)m^2/g$.

The carbon white is commercially available, or can be prepared according to the existing method. For example, the method of preparing the carbon which is disclosed in CN101798088B. For example, the carbon white can be obtained through the combustion reaction of $SiCl_4$, $H_2$ and $O_2$.

Inorganic Amine Source

According to the present invention, the inorganic amine source can be an inorganic ammonium salt and/or aqueous ammonia. The inorganic ammonium salt can be one or more of ammonium chloride, ammonium nitrate, and ammonium sulphate. The inorganic amine source is preferably aqueous ammonia.

Full-Si Molecular Sieve

The present invention provides a full-Si molecular sieve, wherein the full-Si molecular sieve has a $Q^4/Q^3$ of (10-90):1, wherein $Q^4$ is the peak strength at the chemical shift of $-112\pm2$ ppm in the $^{29}Si$ NMR spectrum of the full-Si molecular sieve, expressed as the peak height relative to the base line;

$Q^3$ is the peak strength at the chemical shift of $-103\pm2$ ppm in the $^{29}Si$ NMR spectrum of the full-Si molecular sieve, expressed as the peak height relative to the base line.

Said $Q^4/Q^3$ is preferably (10-70):1, for example, (15-50):1.

The full-Si molecular sieve can have a crystal grain size (in the short axis direction) of 140 nm to 2 μm, e.g. 200 nm-2 μm, or 200 nm-700 nm.

The full-Si molecular sieve particle is a single crystal grain or an aggregate formed by multiple crystal grains.

The full-Si molecular sieve can be S-1 molecular sieve, S-2 molecular sieve or beta molecular sieve.

The full-Si molecular sieve can be a MFI-structured full-Si micropore and mesopore complex molecular sieve, a MEL-structured full-Si micropore and mesopore complex molecular sieve, or a BEA-structured full-Si micropore and mesopore complex molecular sieve.

In an embodiment, the full-Si molecular sieve is a S-1 molecular sieve, the used template agent can be tetrapropylammonium hydroxide, or can be a mixture of tetrapropylammonium hydroxide and one or more of the organic amine, tetrapropylammonium chloride, and tetrapropylammonium bromide.

In an embodiment, the full-Si molecular sieve is a S-2 molecular sieve, the used template agent can be tetrabutylammonium hydroxide, or can be a mixture of tetrabutylammonium hydroxide and one or more of the organic amine, tetrabutylammonium chloride, and tetrabutylammonium bromide.

In an embodiment, the full-Si molecular sieve is a beta molecular sieve, the used template agent can be tetraethylammonium hydroxide, or can be a mixture of tetraethylammonium hydroxide and one or more of the organic amine, tetraethylammonium chloride, and tetraethylammonium bromide.

In an embodiment, the full-Si molecular sieve is a S-1 molecular sieve, the used template agent can be a mixture of tetrapropylammonium chloride and/or tetrapropylammonium bromide and the organic amine.

In an embodiment, the full-Si molecular sieve is a S-2 molecular sieve, the used template agent can be a mixture of tetrabutylammonium chloride and/or tetrabutylammonium bromide and the organic amine.

In an embodiment, the full-Si molecular sieve is a beta molecular sieve, the used template agent can be a mixture of tetraethylammonium chloride and/or tetraethylammonium bromide and the organic amine.

In an embodiment, the full-Si molecular sieve is a MFI-structured full-Si micropore and mesopore complex molecular sieve, the used organic quaternary ammonium compound can comprise or can be one or more of tetrapropylammonium hydroxide, tetrapropylammonium chloride, tetrapropylammonium bromide. In an embodiment, the molar ratio of one or more of tetrapropylammonium hydroxide, tetrapropylammonium chloride and tetrapropylammonium bromide to the total silicon source can be not less than 0.01:1, for example, (0.02-0.2):1, or (0.04-0.15):1.

In an embodiment, the full-Si molecular sieve is a MEL-structured full-Si micropore and mesopore complex molecular sieve, the used organic quaternary ammonium compound can comprise or can be one or more of tetrabutylammonium hydroxide, tetrabutylammonium bromide, and tetrabutylammonium chloride. In an embodiment, the molar ratio of one or more of tetrabutylammonium hydroxide, tetrabutylammonium bromide and tetrabutylammonium chloride to the total silicon source can be not less than 0.01:1, for example, (0.02-0.2):1, or (0.04-0.15):1.

In an embodiment, the full-Si molecular sieve is a BEA-structured full-Si micropore and mesopore complex molecular sieve, the used organic quaternary ammonium compound can comprise or can be one or more of tetraethylammonium hydroxide, tetraethylammonium bromide and tetraethylammonium chloride. In an embodiment, the molar ratio of one or more of tetraethylammonium hydroxide, tetraethylammonium bromide and tetraethylammonium chloride to the total silicon source can be not less than 0.01:1, for example, (0.02-0.2):1, or (0.04-0.15):1.

Synthesis Process

In an embodiment, the process for synthesizing the full-Si molecular sieve of the present invention comprises the following steps of:

(1) a template agent, an organic silicon source, an inorganic amine source and water are mixed and stirred;

(2) the product obtained in the step (1) is aged;

(3) the aged product obtained in the step (2) and a solid silicon source are mixed homogeneously, then subjected to crystallization in a close reaction vessel, the full-Si molecular sieve is collected; and (4) optionally, the molecular sieve is recrystallized.

In the step (1), the inorganic amine source is preferably aqueous ammonia.

In an embodiment, the molar ratio of aqueous ammonia to the total silicon source can be (0.01-0.1):1.

In an embodiment, the molar ratio of aqueous ammonia to the total silicon source can be (0.01-0.07):1.

In an embodiment, the molar ratio of aqueous ammonia to the total silicon source can be (0.01-0.05):1.

In the step (1), a template agent, an organic silicon source, an inorganic amine source and water are mixed, the resulting mixture is stirred at 0° C. to 150° C., e.g. 0° C. to 100° C., e.g. 10° C. to 100° C., e.g. 20° C. to 100° C., e.g. 50° C. to 95° C., e.g. 50° C. to 90° C. for at least 10 minutes, so that the organic silicon source is hydrolyzed, and the content of monohydric alcohol in the resulting mixture is reduced, i.e. being subjected to hydrolyzation and removing alcohols. Generally, the stirring time is 10 minutes to 3000 minutes, e.g. 2 hours to 30 hours.

By hydrolyzation and removing alcohols, a clear hydrolysis solution of the organic silicon source is obtained. Generally, in the mixture obtained in the step (1), the weight content of alcohols produced by hydrolyzation of the organic silicon source is not higher than 10 ppm. Preferably, the weight content of monohydric alcohol in the mixture obtained in the step (1) is not higher than 10 ppm.

In the step (2), the product obtained in the step (1) is aged. Said aging is to keep the product obtained in the step (1) by standing at room temperature for 1 hour to 60 hours. Said room temperature is 15° C. to 40° C.; the aging time is 1 hour to 60 hours, e.g. 2 hours to 50 hours, e.g. 3 hours to 50 hours, e.g. 3 hours to 30 hours, e.g. 3 hours to 15 hours. No stirring is conducted during the aging, and the product obtained in the step (1) is kept by standing.

In the step (3), the aged product obtained in the step (2) and the solid silicon source are mixed, the molar ratio of the product obtained in the step (2) and the solid silicon source, as $SiO_2$, is 1:(0.10-10) (i.e. the molar ratio of the organic silicon source to the solid silicon source, being equal to the weight ratio), e.g. 1:(0.2-9), or 1:(1-9), or 1:(2-8) or 1:(1-7) or 1:(3-7) or 1:(3-6). The aged product obtained in the step (2) and the solid silicon source are mixed and stirred homogenously. Generally, the stirring time is at least 15 minutes, e.g. 0.5 hour to 5 hours.

In the process for synthesizing the full-Si molecular sieve of the present invention, a higher proportion of the solid silicon source can be used, the solid content of the crystallization product can be increased, and therefore the output for a single synthesis can be increased without changing the synthesis reactor. The crystal grains of the obtained product are smaller than those obtained by using the solid silicon source with the prior method, and can be comparable to those obtained by only using the organic silicon source, or even smaller than those obtained by only using the organic silicon source. Furthermore, the crystal grain size can be adjusted by changing the ratio of the solid silicon source to the organic silicon source.

In the step (3), the crystallization temperature is 110° C. to 200° C., for example, 140° C. to 180° C., or 160° C. to 180° C.

In the step (3), the crystallization pressure is an autogenous pressure.

In the step (3), the crystallization time is 2 hours to 20 days, 0.5 day to 20 days, 0.5 day to 10 days, or 0.5 day to 6 days, or 0.5 day to 3 days, or 1 day to 3 days.

The crystallization can be conducted in a stainless steel stirring vessel.

The temperature rise in the crystallization can be a one-stage temperature rise, or a multiple-stage temperature rise. The temperature rise in the crystallization can be conducted in a conventional manner. The rate in the temperature rise can be (0.5-1°) C/min.

In an embodiment, the crystallization is conducted under the following conditions: the crystallization temperature is 160° C. to 180° C., the crystallization time is 0.5 day to 6 days or 0.5 day to 3 days or 1 day to 3 days, the crystallization pressure is an autogenous pressure.

In an embodiment, the crystallization is conducted under the following conditions: the crystallization is performed at 100° C. to 130° C., e.g. at 110° C. to 130° C. for 0.5 day to 1.5 days, and then at 160° C. to 180° C. for 1 day to 3 days, the crystallization pressure is an autogenous pressure.

In the step (3), the procedure for collecting the full-Si molecular sieve is a conventional method, and can comprise filtering the crystallization product and washing and calcining, or filtering the crystallization product and washing, drying and calcining.

The object of filtering is to separate the full-Si molecular sieve obtained by crystallization from the crystallization mother liquor;

The object of washing is to wash off the silicon-containing template agent solution (e.g. TPAOH solution) adsorbed on the surface of the molecular sieve particles;

The object of drying is to remove most water in the molecular sieve to reduce the water evaporation amount during calcination;

The object of calcination is to remove the template agent in the molecular sieve.

In the step (3), the washing can be conducted with water, wherein the weight ratio of the molecular sieve to water can be 1:(1-20) or 1:(1-15). The washing temperature can be room temperature to 50° C.

The drying temperature can be 100° C. to 200° C.

The calcination temperature can be 350° C. to 650° C. The calcination time can be 2 hours to 10 hours.

The product of the full-Si molecular sieve according to the present invention is obtained through the collection.

According to the process for synthesizing the full-Si molecular sieve of the present invention, the full-Si molecular sieve obtained by the collection in the step (3) can also be subjected to a molecular sieve recrystallization, i.e., the full-Si molecular sieve obtained in the step (3) is subjected to crystallization in an organic base solution, and then the full-Si molecular sieve is collected. This procedure allows the obtained full-Si molecular sieve to have a hollow structure.

Specifically, the full-Si molecular sieve obtained in the step (3), an organic base and water are mixed. The resulting mixture is subjected to crystallization in a close reaction vessel, and then the product is collected; wherein the crystallization pressure can be an autogenous pressure; the crystallization temperature can be 100° C. to 200° C., or 100° C. to 150° C., or 120° C. to 200° C., or 150° C. to 200° C., the crystallization time can be 0.1 day to 10 days, or 0.5 day to 10 days, or 0.5 day to 8 days, or 0.5 day to 6 days.

In an embodiment, in the step (4), the molar ratio of the full-Si molecular sieve:the organic base:water can be 1:(0.02-0.5):(2-50), for example, 1:(0.05-0.2):(2-20).

In an embodiment, in the step (4), the molar ratio of the full-Si molecular sieve to the organic base can be 1:(0.02-0.5), or 1:(0.02-0.2), the molar ratio of the full-Si molecular sieve to water can be 1:(2-50), 1:(2-20), or 1:(5-10).

In the step (4), the organic base is an organic quaternary ammonium base and/or an organic amine, the organic quaternary ammonium base is for example one or more tetrapropylammonium hydroxide, tetrabutylammonium hydroxide and tetraethylammonium hydroxide; the organic amine is one or more of aliphatic amine, aromatic amine and alcoholic amine, the aliphatic amine can have a general formula of $R^3(NH_2)_n$, wherein $R^3$ is $C_{1-4}$alkyl or $C_{1-4}$alkylene, n is 1 or 2; the alcoholic amine can have a general formula of $(HOR^4)_m NH_{(3-m)}$, wherein R4 is $C_1$-$C_4$alkyl, m is 1, 2 or 3. The aliphatic amine is for example one or more of ethylamine, n-butylamine, butylene diamine and hexamethylene diamine. The aromatic amine refers to an amine having an aromatic substituent, e.g. one or more of aniline, amino toluene, p-phenylene diamine. The alcoholic amine is for example one or more of monoethanolamine, diethanolamine and triethanolamine.

In the step (4), the organic base is preferably an organic quaternary ammonium base, wherein the molar ratio of the molecular sieve (as $SiO_2$) to the organic quaternary ammonium base is 1:(0.02-0.5), for example, 1:(0.05-0.2); the molar ratio of the molecular sieve (as $SiO_2$) to water is 1:(2-50), for example, 1:(2-20), or 1:(5-10), the crystallization temperature is 120° C. to 200° C., the crystallization time is 0.5 day to 8 days, the crystallization pressure is an autogenous pressure. Preferably, in the step (4), the crystallization temperature is 150° C. to 200° C., and the crystallization time is 0.5 day to 6 days.

In the step (4), the collection procedure is conventional, and a reference can be made to the collection procedure in the step (3). It generally comprises filtering the crystallization product, washing, drying (optionally) and calcination.

In an embodiment, the full-Si molecular sieve is a S-1 molecular sieve, and the organic quaternary ammonium base used in the step (4) is tetrapropylammonium hydroxide.

In an embodiment, the full-Si molecular sieve is a S-2 molecular sieve, and the organic quaternary ammonium base used in the step (4) is tetrabutylammonium hydroxide.

In an embodiment, the full-Si molecular sieve is a beta molecular sieve, and the organic quaternary ammonium base used in the step (4) is tetraethylammonium hydroxide.

In an embodiment, the full-Si molecular sieve is a MFI-structured full-Si micropore and mesopore molecular sieve, and the organic quaternary ammonium base used in the step (4) is tetrapropylammonium hydroxide.

In an embodiment, the full-Si molecular sieve is a MEL-structured full-Si micropore and mesopore molecular sieve, and the organic quaternary ammonium base used in the step (4) is tetrabutylammonium hydroxide.

In an embodiment, the full-Si molecular sieve is a BEA-structured full-Si micropore and mesopore molecular sieve, and the organic quaternary ammonium base used in the step (4) is tetraethylammonium hydroxide.

The recrystallization of the molecular sieve in the step (4) can be conducted once, or can be repeated once or more than once. Said repeating is to conduct the treatment of the step (4) but replace the full-Si molecular sieve obtained in the step (3) with the molecular sieve that has been treated in the step (4).

Through the recrystallization treatment, a full-Si molecular sieve having a secondary pore structure can be obtained. The crystal grain of the obtained full-Si molecular sieve has a hollow structure, with a radial length of 5-300 nm for the cavity portion of the hollow grain, the adsorption capacity of benzene measured for the molecular sieve sample under the conditions of 25° C., P/P0=0.10 and 1 hour of adsorption time is at least 70 mg/g, and there is a hysteresis loop between the adsorption isotherm and the desorption isotherm for nitrogen adsorption by the molecular sieve at a low temperature. The molecular sieve has a higher pore volume and specific surface area.

Measurement

According to the present invention, $Q^4/Q^3$ is determined with the $^{29}Si$ MAS NMR.

According to the present invention, the crystal grain size is determined with SEM.

Instruments

The $^{29}Si$ MAS NMR result is obtained by using Varian NOVA 300 type nuclear magnetic resonance spectrometer with a solid double resonance detector and Φ 6 mm ZrO2 rotor.

Resonance frequency for $^{29}Si$ detection core: 59.588 MHz.

Magic-angle-spinning rate: 3 kHz
Sampling time: 0.02 s
Pulse width: 1.5 μs
Cycle delay time: 3s
Scanning number: 3000.

The SEM result is obtained by using Quanta 200F type scanning electron microscope (manufactured by FEI) is used. The sample is dried, and coated with golden by vacuum evaporation to increase the electric conductivity and the contrast effect. The analysis electron microscope acceleration voltage is 20.0 kV, and the magnification is 1-30 k.

The TEM result is obtained by using Tecnai F20 G2S-TWIN type transmission electron microscope (manufactured by FEI), which is equipped with an energy filtering system GIF2001 (Gatan). The accessory is provided with an X-ray energy spectrometer. The electron microscope sample is dispersed by suspension onto a micro-grid with a diameter of 3 mm.

The XRD result is obtained by using Siemens D5005 type X-ray diffractometer.

Radiation source: CuKα (λ=1.5418 Å), tube voltage: 40 kV, tube current: 40 mA, scan speed: 0.5°/min, scan range: 2θ=4°-40°.

BET specific surface area and pore volume are determined by the nitrogen adsorption capacity measurement in combination with the BJH calculation method, according to the standard method RIPP151-90. A reference can be made to Analytical Methods in Petrochemical Industry (RIPP Experiment Techniques), Yang Cuiding et. al, Science Press, 1990.

The XRF result is obtained by using 3271E type X-ray fluorescence spectrometer (Rigaku Industrial Corporation). The sample is obtained with powder tabletting. Target: rhodium, excitation voltage: 50 kV, excitation current: 50 mA. The spectral line intensity of each element is detected by a scintillation counter and a proportional counter.

The XPS result is obtained by using ESCALAB 250 type X-ray Photoelectron Spectrometer (manufactured by Thermo Fischer-VG), Al Kα monochromator, Mg/Al binode, Mg Kα X-ray, Power: 200 W, the binding energy is corrected with alkyl carbon or the contaminated C1s peak (284.8 eV). Etching analysis is used with Ar+ sputtering, excitation source: binode Mg Kα X, the basic vacuum degree is about $6.5\times10^{-7}$ Pa (in the analysis process).

Materials

Tetrapropylammonium bromide, Guang Dong Dayou Chemical plant, with a concentration of 20.05 wt %.

Tetrapropylammonium chloride, Guang Dong Dayou Chemical plant, with a concentration of 20.05 wt %.

Tetrapropylammonium hydroxide (TPAOH), Guang Dong Dayou Chemical plant, with a concentration of 25.05 wt %.

Tetraethyl orthosilicate, analytically pure, Sinopharm Chemical Reagent limited corporation.

Tetrapropylammonium bromide solid, analytically pure, Sinopharm Chemical Reagent limited corporation.

Long-chain alkyl trimethyl ammonium bromide, analytically pure, Sinopharm Chemical Reagent limited corporation.

Aqueous ammonia, analytically pure, with a concentration of 20 wt %.

Carbon white, available from JuHua (ZheJiang), Model AS-150; solid content >95 wt %, $SiO_2$ content (dry basis) >99.99 wt %, Total content of Fe, Na and Al<10 ppm, Specific surface area 195 m²/g.

Other agents are commercially available, analytically pure.

Example 1

(1) To a 500 mL baker, were successively added 12.47 g of aqueous tetrapropylammonium hydroxide solution (in a concentration of 25.05 wt %), 20.8 g of tetraethyl orthosilicate, 0.26 g of aqueous ammonia (in a concentration of 20 wt %) and 33.85 g of deionized water. A magnetic stirring bar with heating and stirring functions was placed in the baker. The mixture was stirred at 80° C. for 4 hours. Water was supplemented to the mixture, if necessary. A Si-containing hydrolysis solution of the organic base was obtained, wherein the monohydric alcohol content was less than 10 ppm;

(2) The resulting Si-containing hydrolysis solution of the organic base was cooled under stirring to 26° C., and then kept by standing at 26° C. for 12 hours, to produce an aged product;

(3) Under stirring, to the resulting aged product was added 12 g of carbon white powder (dry basis). The resulting mixture was stirred for 1 hour, then transferred to a close stainless steel reaction vessel, and crystallized at a constant temperature of 165° C. for 12 hours to produce a full-Si S-1 molecular sieve crystallization product. The resulting S-1 molecular sieve crystallization product was filtered. The filter cake was washed with deionized water (10× molecular sieve weight), dried at 120° C. for 24 hours, and calcined at 550° C. for 6 hours to produce a S-1 sample S-1-Y1A.

The XRD spectrum for S-1-Y1A was shown in FIG. 1.

Figure 3:
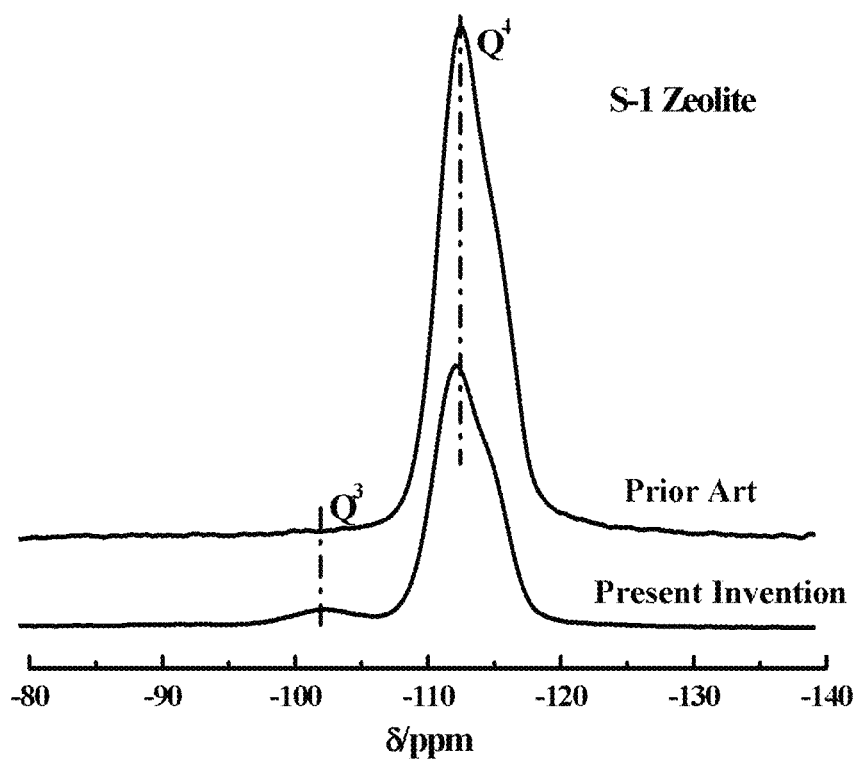
FIG. 3 is a $^{29}Si$ NMR spectrum of S-1 molecular sieves, which are synthesized according to the present invention and the prior art respectively.

The $^{29}$Si NMR spectrum for S-1-Y1A was shown in FIG. 3.

Figure 4:
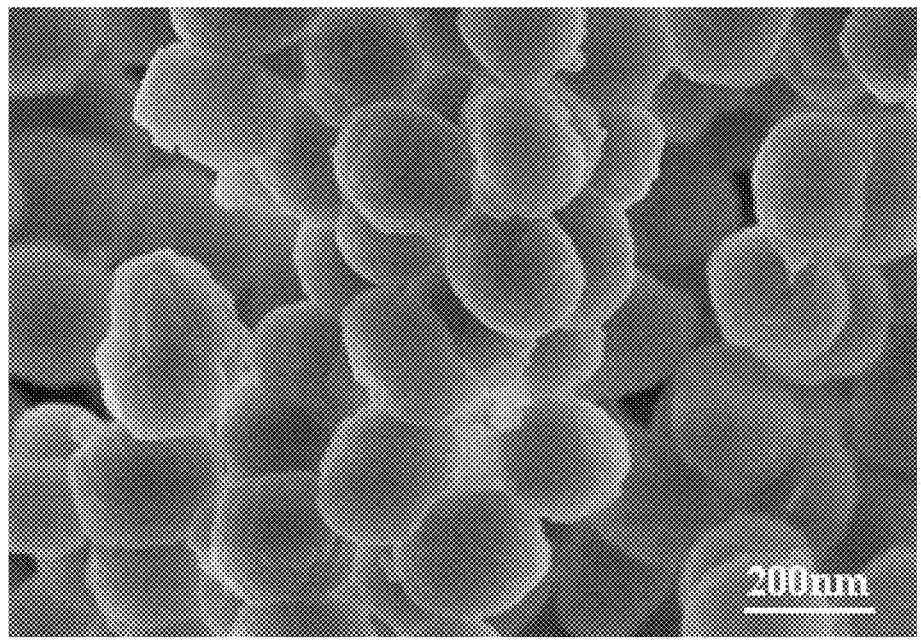
FIG. 4 is a SEM photo of S-1 molecular sieve, which is synthesized according to the present invention.

The SEM photo for S-1-Y1A was shown in FIG. 4.

S-1-Y1A had a BET specific surface area of 425 m$^2$/g, a micropore volume of 0.170 mL/g, and a mesopore volume of 0.085 mL/g.

(4) 6 g of S-1-Y1A sample and 10 wt % of aqueous TPAOH solution were mixed homogenously, wherein the used amount of the aqueous solution was 22 g. The resulting mixture was crystallized at 150° C. in a close reaction vessel for 3 days. After filtering, the resulting filter cake was washed, dried at 120° C. for 24 hours, and calcined at 550° C. for 6 hours to produce a sample S-1-Y1AP.

S-1-Y1AP had a BET specific surface area of 450 m$^2$/g, a micropore volume of 0.152 mL/g, and a mesopore volume of 0.165 mL/g.

Figure 6:
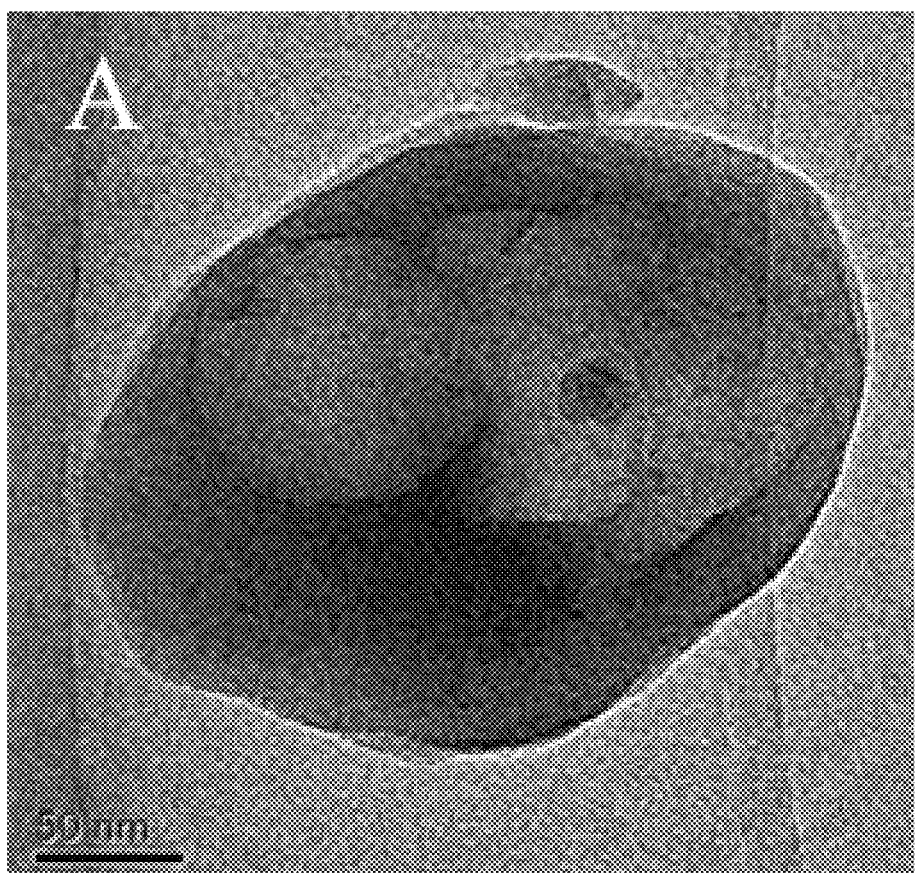
FIG. 6 is a TEM photo of S-1 molecular sieve, which is synthesized according to the present invention.

S-1-Y1AP had a hollow structure, according to the transmission electron microscope (TEM) photo (as shown in FIG. 6).

The material composition, the reaction condition, and the result were shown in Tables 1-3.

Examples 2-6

Molecular sieves were prepared according to Example 1, except for the different compositions and the reaction conditions, wherein the step (4) was not changed. The material compositions, the reaction conditions, and the results were shown in Tables 1-3.

Example 7

A molecular sieve was prepared according to Example 1, except for the different composition and the reaction condition, wherein the step (4) was not changed. The material composition, the reaction condition, and the result were shown in Tables 1-3, wherein the template agent was TPAOH (tetrapropylammonium hydroxide) and ethylamine, the molar ratio of TPAOH:ethylamine=0.1:0.15.

Example 8

A molecular sieve was prepared according to Example 1, except for the different composition and the reaction condition, wherein the step (4) was not changed. The material composition, the reaction condition, and the result were shown in Tables 1-3, wherein the template agent was changed to prepare a full-Si S-2 molecular sieve.

Example 9

A molecular sieve was prepared according to Example 1, except for the different composition and the reaction condition, wherein the step (4) was not changed. The material composition, the reaction condition, and the result were shown in Tables 1-3, wherein the template agent was changed to prepare a full-Si 0 molecular sieve.

Figure 2:
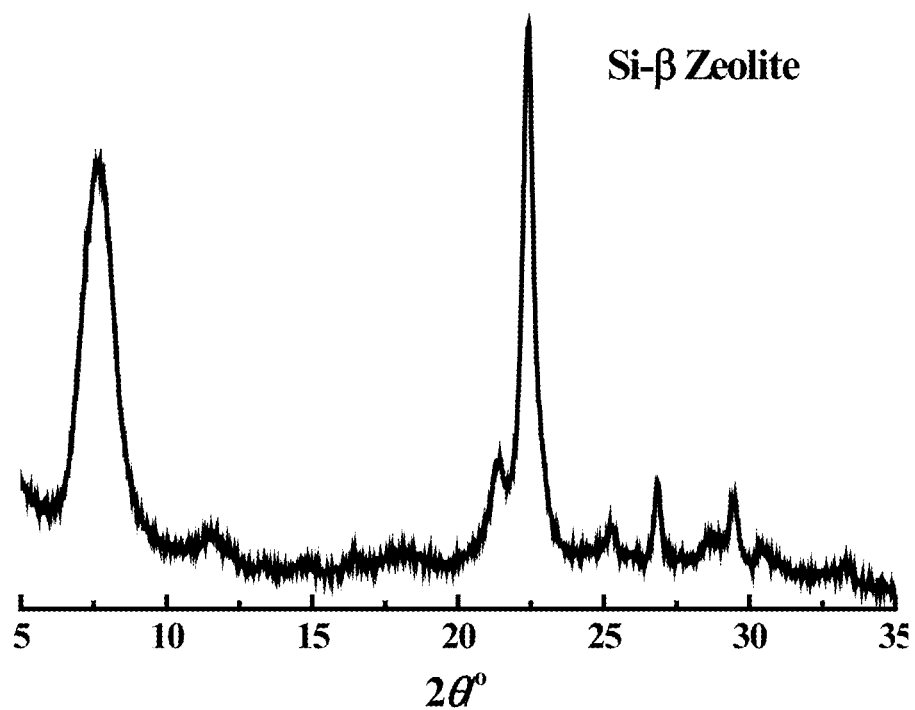
FIG. 2 is an XRD spectrum of a beta molecular sieve, which is synthesized according to the present invention.
Figure 5:
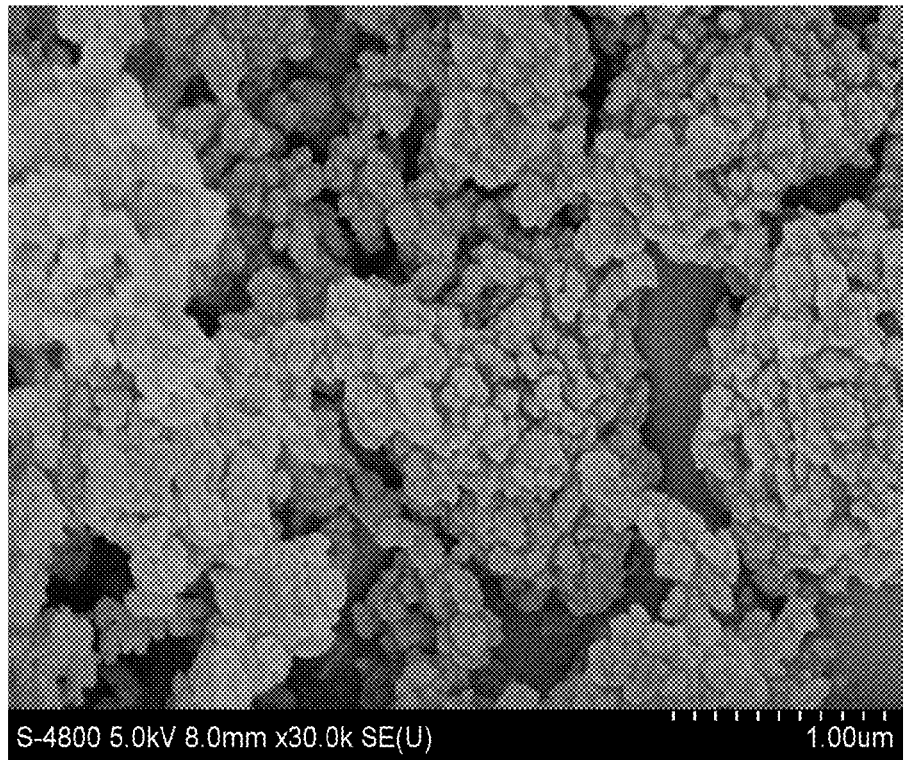
FIG. 5 is a SEM photo of a beta molecular sieve, which is synthesized according to the present invention.

The XRD spectrum was shown in FIG. 2, and the SEM photo was shown in FIG. 5.

Comparative Example 1

The preparation of the full-Si molecular sieve S-1 according to the method disclosed in CN1338427A.

208 g of tetraethyl orthosilicate and 180 g of tetrapropylammonium hydroxide solution (in a concentration of 22.05%) were mixed. To the mixture was added 64.5 g of deionized water. The resulting mixture was mixed homogenously, and then subjected to hydrolyzation and removing alcohols at 60-80° C. for 5-9 hours to produce a hydrolysis solution containing tetraethyl orthosilicate. Under the violent stirring, the hydrolysis solution was continuously stirred at 75° C. for 7 hours to produce a colloid. Then, the colloid was transferred to a close stainless steel reaction vessel, and crystallized at a constant temperature of 170° C. for 2 days to produce a crude molecular sieve.

The resulting crude molecular sieve was filtered, washed, dried at 120° C. for 24 hours, and calcined at 550° C. for 6 hours. 6 g of the calcined molecular sieve and 22 g of aqueous TPAOH solution (in a concentration of 22.05 wt %) were mixed homogenously. The resulting mixture was crystallized at 150° C. in a close reaction vessel for 1 day. After filtering the resulting mixture, the filter cake was washed, dried at 120° C. for 24 hours, and calcined at 550° C. for 6 hours to produce a conventional S-1 molecular sieve.

The material composition, the reaction condition, and the result were shown in Tables 1-3.

Comparative Example 2

A full-Si molecular sieve was prepared according to Comparative Example 1, except that the same amount of carbon white (as SiO$_2$) was used to substitute tetraethyl orthosilicate (as SiO$_2$) in Comparative Example 1. The material composition, the reaction condition, and the result were shown in Tables 1-3.

Comparative Example 3

A molecular sieve was prepared according to Example 1, except that no aqueous ammonia was added.

The material composition, the reaction condition, and the result were shown in Tables 1-3.

Comparative Example 4

A molecular sieve was prepared according to Example 1, except that the solid silicon source, the organic silicon source, the template agent, and water were mixed, after stirring and hydrolysis, the mixture was crystallized without adding aqueous ammonia.

The material composition, the reaction condition, and the result were shown in Tables 1-3.

Comparative Example 5

A molecular sieve was prepared according to Example 1, except that the aging was not conducted. The material composition, the reaction condition, and the result were shown in Tables 1-3.

Example 10

(1) To a 500 mL baker, were successively added 17.9 g of aqueous tetrapropylammonium bromide (TPABr) solution (in a concentration of 20.05 wt %), 1.62 g of ethylene diamine, 20.8 g of tetraethyl orthosilicate, 0.26 g of aqueous ammonia (in a concentration of 20 wt %) and 13.5 g of deionized water. A magnetic stirring bar with heating and stirring functions was placed in the baker. The mixture was stirred at 80° C. for 4 hours. Water was supplemented to the mixture, if necessary. A Si-containing hydrolysis solution of the organic base was obtained, wherein the monohydric alcohol content was less than 10 ppm;

(2) The resulting Si-containing hydrolysis solution of the organic base was cooled under stirring to 26° C., and then kept by standing at 26° C. for 12 hours, to produce an aged product;

(3) Under stirring, to the resulting aged product was added 12 g of carbon white powder (dry basis). The resulting mixture was stirred for 2 hours, then transferred to a close stainless steel reaction vessel, and crystallized at a constant temperature of 165° C. for 12 hours to produce a full-Si S-1 molecular sieve crystallization product. The resulting S-1 molecular sieve crystallization product was filtered. The filter cake was washed with deionized water (10× molecular sieve weight), dried at 120° C. for 24 hours, and calcined at 550° C. for 6 hours to produce a S-1 sample S-1-Y1B.

Figure 7:
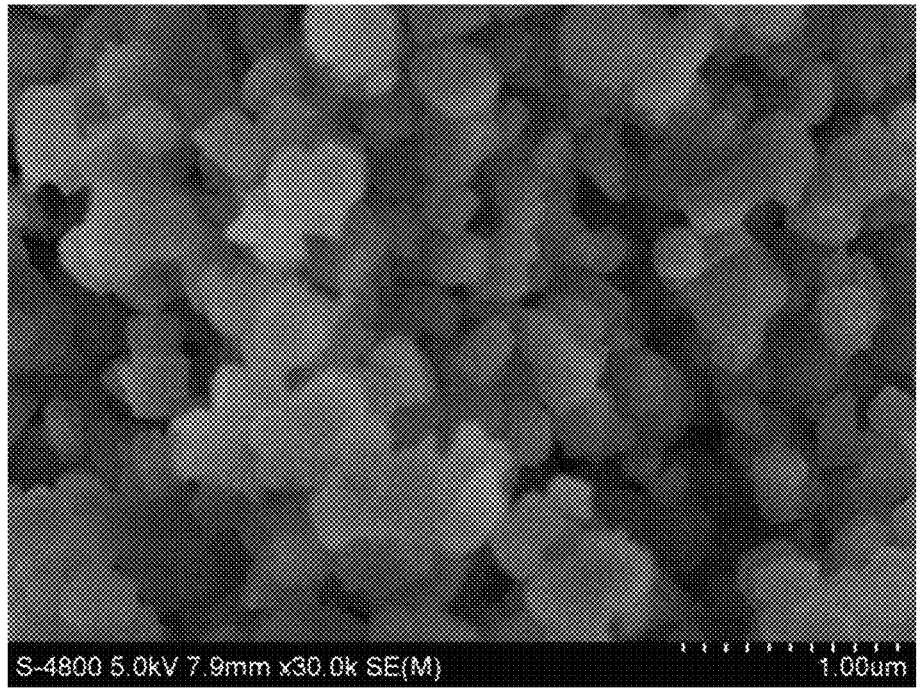
FIG. 7 is a SEM photo of S-1 molecular sieve, which is synthesized according to the present invention.

The SEM photo for S-1-Y1B was shown in FIG. 7.

S-1-Y1B had a BET specific surface area of 420 $m^2/g$, a micropore volume of 0.171 mL/g, and a mesopore volume of 0.082 mL/g.

(4) 6 g of S-1-Y1B sample and 10 wt % of aqueous TPAOH solution were mixed homogenously, wherein the used amount of the aqueous solution was 25.2 g. The resulting mixture was crystallized at 150° C. in a close reaction vessel for 3 days. After filtering, the resulting filter cake was washed, dried at 120° C. for 24 hours, and calcined at 550° C. for 6 hours to produce a sample S-1-Y1BP.

S-1-Y1BP had a BET specific surface area of 437 $m^2/g$, a micropore volume of 0.155 mL/g, and a mesopore volume of 0.158 mL/g.

Figure 9:
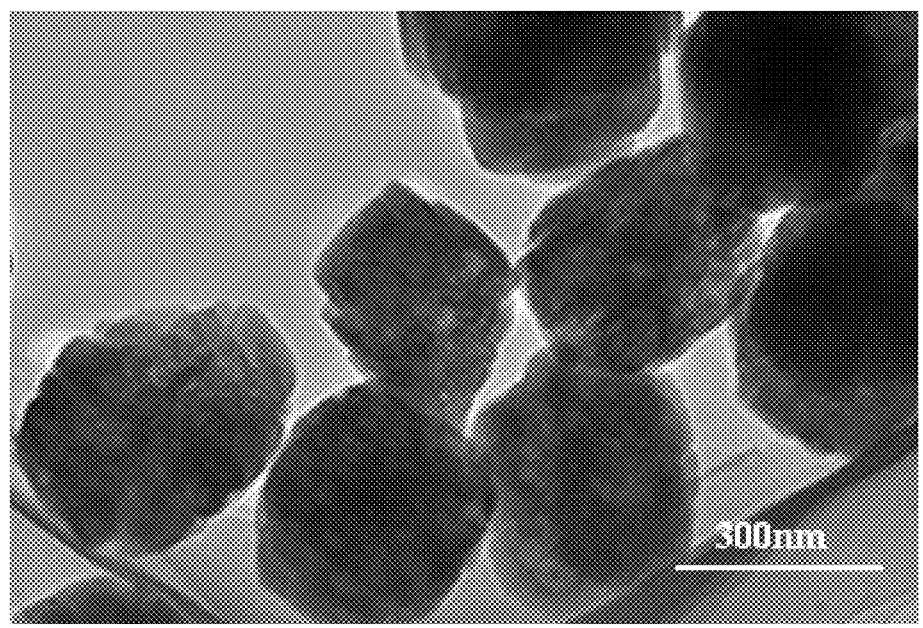
FIG. 9 is a TEM photo of S-1 molecular sieve, which is synthesized according to the present invention.

S-1-Y1BP had a hollow structure, according to the transmission electron microscope (TEM) photo (as shown in FIG. 9).

The material composition, the reaction condition, and the result were shown in Tables 1-3.

Example 11-15

Molecular sieves were prepared according to Example 10, except for the different compositions and the reaction conditions, wherein the step (4) was not changed. The material compositions, the reaction conditions, and the results were shown in Tables 1-3.

Example 16

A molecular sieve was prepared according to Example 10, except for the different composition and the reaction condition, wherein the step (4) was not changed. The material composition, the reaction condition, and the result were shown in Tables 1-3, wherein the template agent was tetrapropylammonium chloride (TPACl) and ethylamine, the molar ratio of TPACl:ethylamine=0.1:0.15.

Example 17

A molecular sieve was prepared according to Example 10, except for the different composition and the reaction condition, wherein the step (4) was not changed. The material composition, the reaction condition, and the result were shown in Tables 1-3, wherein the template agent was changed to prepare a full-Si S-2 molecular sieve.

Example 18

A molecular sieve was prepared according to Example 10, except for the different composition and the reaction condition, wherein the step (4) was not changed. The material composition, the reaction condition, and the result were shown in Tables 1-3, wherein the template agent was changed to prepare a full-Si β molecular sieve.

Figure 8:
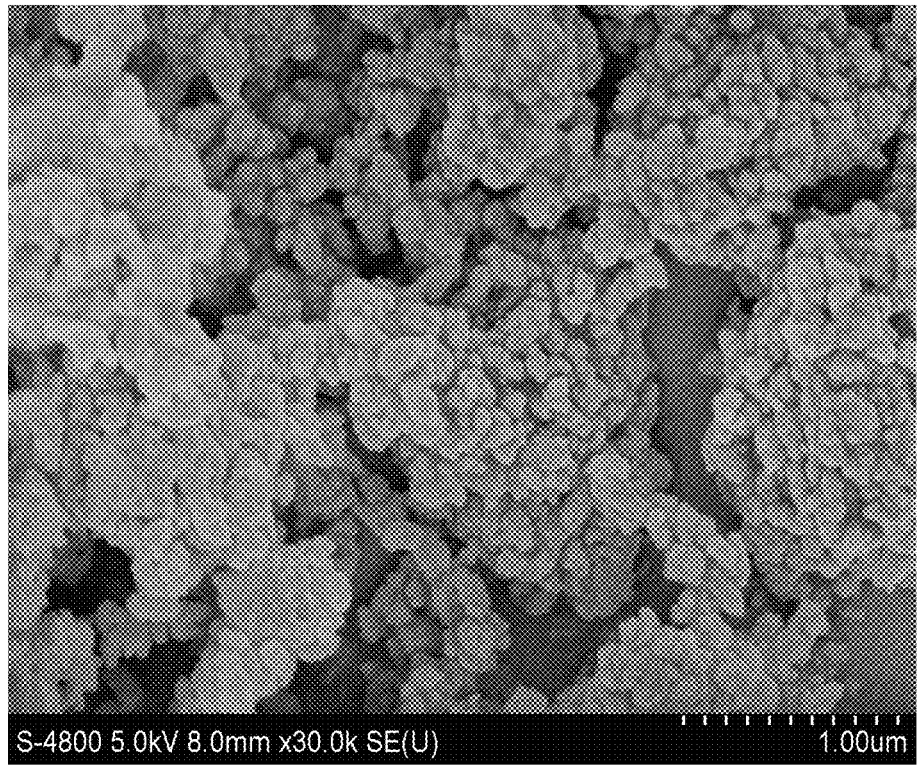
FIG. 8 is a SEM photo of a beta molecular sieve, which is synthesized according to the present invention.

The SEM photo was shown in FIG. 8.

Comparative Example 6

A molecular sieve was prepared according to Example 10, except that no aqueous ammonia was added and the aging was not conducted.

The material composition, the reaction condition, and the result were shown in Tables 1-3.

Comparative Example 7

A molecular sieve was prepared according to Example 10, except that the solid silicon source, the organic silicon source, the template agent, and water were mixed, after stirring and hydrolysis, the mixture was crystallized without adding aqueous ammonia.

The material composition, the reaction condition, and the result were shown in Tables 1-3.

Comparative Example 8

A molecular sieve was prepared according to Example 10, except that the aging was not conducted. The material composition, the reaction condition, and the result were shown in Tables 1-3.

Example 19

(1) To a 500 mL baker, were successively added 12.1 g of aqueous tetrapropylammonium hydroxide solution (in a concentration of 25.05 wt %), 0.8 g of tetrapropylammonium bromide solid, 20.8 g of tetraethyl orthosilicate, 2 g of ethylene diamine, 13.14 g of cetyltrimethylammonium bromide, 0.26 g of aqueous ammonia (in a concentration of 20 wt %) and 120 g deionized water.

Figure 10:
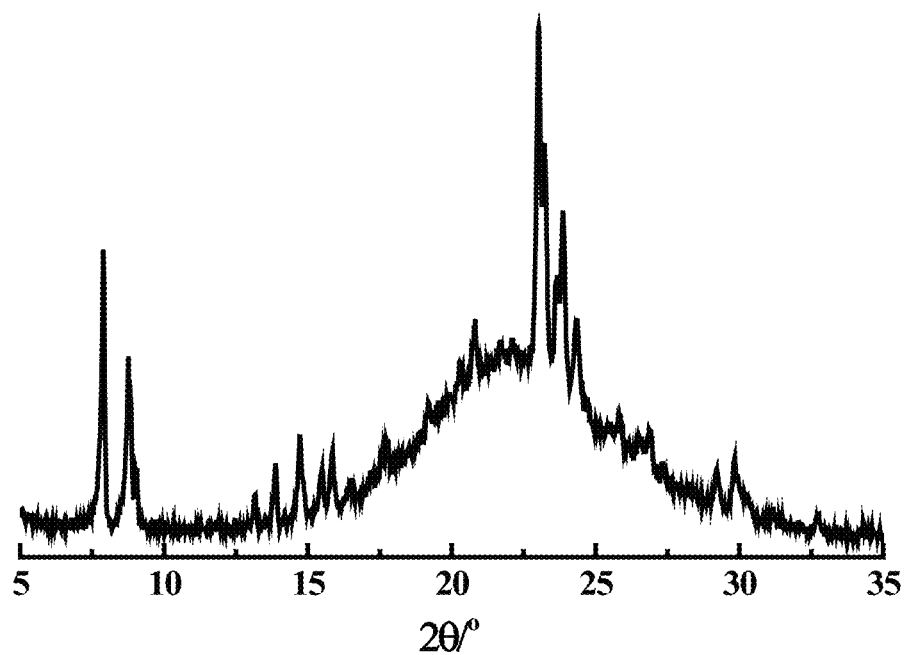
FIG. 10 is an XRD spectrum (2θ angle 5-35°) of the full-Si micropore and mesopore complex molecular sieve, which is synthesized according to the present invention.
Figure 11:
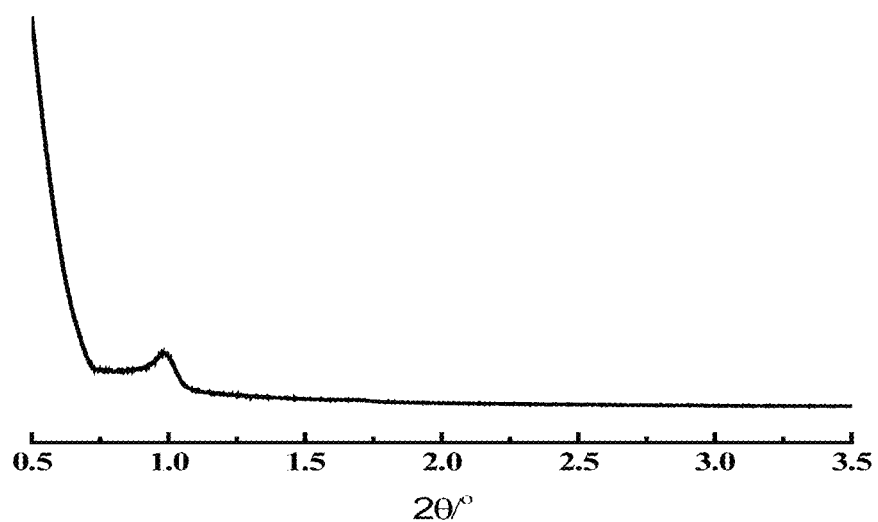
FIG. 11 is a small-angle XRD spectrum (2θ angle 0-3°) of the full-Si micropore and mesopore complex molecular sieve, which is synthesized according to the present invention.

A magnetic stirring bar with heating and stirring functions was placed in the baker. The mixture was stirred at 80° C. for 4 hours. Water was supplemented to the mixture, if neccessary. A Si-containing hydrolysis solution of the organic base was obtained, wherein the monohydric alcohol content was less than 10 ppm;

(2) The resulting Si-containing hydrolysis solution of the organic base was cooled under stirring to 26° C., and then kept by standing at 26° C. for 12 hours, to produce an aged product;

(3) Under stirring, to the resulting aged product was added 12 g of carbon white powder. The resulting mixture was stirred for 1 hour, then transferred to a close stainless steel reaction vessel, and crystallized at a constant temperature of 165° C. for 12 hours to produce a full-Si micropore and mesopore complex molecular sieve crystallization product. The resulting full-Si micropore and mesopore complex molecular sieve crystallization product was filtered. The filter cake was washed with deionized water (10× molecular sieve weight), dried at 120° C. for 24 hours, and calcined at 550° C. for 6 hours to produce a MFI-structured full-Si micropore and mesopore complex molecular sieve sample S-Y1;

The XRD spectrum for S-Y1 was shown in FIG. 10 and FIG. 11.

S-Y1 had a BET specific surface area of 525 m$^2$/g, a micropore volume (pore diameter<1 nm) of 0.175 mL/g, and a mesopore volume (pore diameter=2-8 nm) of 0.423 mL/g. S-Y1 has a MFI structure.

(4) 6 g of S-Y1 sample and 10 wt % of aqueous TPAOH solution were mixed homogenously, wherein the used amount of the aqueous solution was 22 g. The resulting mixture was crystallized at 150° C. in a close reaction vessel for 3 days. After filtering, the resulting filter cake was washed, dried at 120° C. for 24 hours, and calcined at 550° C. for 6 hours to produce a sample S-Y1P.

S-Y1P had a BET specific surface area of 540 m$^2$/g, a micropore volume (pore diameter<1 nm) of 0.172 mL/g, and a mesopore volume (pore diameter=2-8 nm) of 0.478 mL/g. S-Y1P has a hollow structure, according to the transmission electron microscope (TEM) photo.

The material composition, the reaction condition, and the result were shown in Tables 1-3.

Example 20-22

Molecular sieves were prepared according to Example 19, except for the different compositions and the reaction conditions, wherein the step (4) was not changed. The material compositions, the reaction conditions, and the results were shown in Tables 1-3.

The resulting molecular sieves had a MFI structure.

Example 23-25

Molecular sieves were prepared according to Example 19, except for the different compositions and the reaction conditions, wherein the step (4) was not changed. The material compositions, the reaction conditions, and the results were shown in Tables 1-3.

The resulting molecular sieves had MFI and BEA structures.

Example 26

A molecular sieve was prepared according to Example 19, except for the different compositions and the reaction conditions, wherein the step (4) was not changed. The material compositions, the reaction conditions, and the results were shown in Tables 1-3.

The resulting molecular sieve had a MEL structure.

Example 27

A molecular sieve was prepared according to Example 19, except for the different compositions and the reaction conditions, wherein the step (4) was not changed. The material compositions, the reaction conditions, and the results were shown in Tables 1-3.

The resulting molecular sieve had a BEA structure.

Comparative Example 9

62.4 g of tetraethyl orthosilicate, 12.2 g of tetrapropylammonium hydroxide solution (in a concentration of 25.05%), 0.84 g of tetrapropylammonium bromide solid, 2 g of ethylene diamine, and 13.14 g of cetyltrimethylammonium bromide were mixed. To the mixture was added 144 g of deionized water. The resulting mixture was mixed homogenously, and then subjected to hydrolyzation and removing alcohols at 60-80° C. for 5-9 hours to produce a hydrolysis solution containing tetraethyl orthosilicate. Under the violent stirring, the hydrolysis solution was continuously stirred at 75° C. for 7 hours to produce a colloid. Then, the colloid was transferred to a close stainless steel reaction vessel, and crystallized at a constant temperature of 170° C. for 2 days to produce a crude molecular sieve.

The resulting crude molecular sieve was filtered, washed, dried at 120° C. for 24 hours, and calcined at 550° C. for 6 hours. 6 g of the calcined molecular sieve and 22 g of aqueous TPAOH solution (in a concentration of 22.05 wt %) were mixed homogenously. The resulting mixture was crystallized at 150° C. in a close reaction vessel for 1 day. After filtering the resulting mixture, the filter cake was washed, dried at 120° C. for 24 hours, and calcined at 550° C. for 6 hours to produce a MFI-structured full-Si micropore and mesopore complex molecular sieve.

The material composition, the reaction condition, and the result were shown in Tables 1-3.

Comparative Example 10

A full-Si molecular sieve was prepared according to Comparative Example 9, except that the same amount of carbon white (as SiO$_2$) was used to substitute tetraethyl orthosilicate (as SiO$_2$) in Comparative Example 9. The material composition, the reaction condition, and the result were shown in Tables 1-3.

Comparative Example 11

A molecular sieve was prepared according to Example 19, except that no aqueous ammonia was added.

The material composition, the reaction condition, and the result were shown in Tables 1-3.

Comparative Example 12

A molecular sieve was prepared according to Example 19, except that the solid silicon source, the organic silicon source, the template agent, and water were mixed, after stirring and hydrolysis, the mixture was crystallized without adding aqueous ammonia.

The material composition, the reaction condition, and the result were shown in Tables 1-3.

Comparative Example 13

A molecular sieve was prepared according to Example 19, except that the aging was not conducted.

The material composition, the reaction condition, and the result were shown in Tables 1-3.

Assays

The non-recrystallized molecular sieves and the recrystallized molecular sieves provided in the above Examples and Comparative Examples were evaluated. Beckman rearrangement of cyclohexanone oxime was used to evaluate the catalytic performance of the molecular sieves. The molecular sieves were tabletted and crushed. The particles of 20-60 meshes were used as catalyst.

The evaluation results were shown in Table 3.

The evaluation conditions were as follows:

The reactor was a normal pressure continuous flowing fixed bed. The inner diameter of the reactor was 5 mm. The loading of catalyst (the full-Si molecular sieve) is 0.5 g. The catalyst has a particle size of 20-60 meshes.

The catalyst was loaded into the reactor tube, and pretreated at normal pressure in a nitrogen atmosphere at 350° C. for 2 hours.

The concentration of cyclohexanone oxime was 35.7 wt %, the weight hourly space velocity (WHSV) was 7.5/h, the solvent was methanol, the reaction temperature was 350° C., the nitrogen flow rate was 1.8 L/hr, and the reaction time was 3 hours.

The reaction product was collected by water recycling condensation, and detected with hydrogen flame ionization detector. The composition was measured by gas chromatography (GC).

It is appreciated that certain aspects and characteristics of the invention, which are, for clarity, described in the context of separate embodiments, may also be provided in combination in a single embodiment. Conversely, various aspects and characteristics of the invention, which are, for brevity, described in the context of a single embodiment, may also be provided separately or in any suitable sub-combination.

TABLE 1

| Example | Template agent/ total silicon source | Solid silicon source/organic silicon source | water/ total silicon source | Inorganic amine ($NH_4^+$)/total silicon source | Organic quaternary ammonium compound | Organic quaternary ammonium compound/ total silicon source | Organic quaternary ammonium base |
|---|---|---|---|---|---|---|---|
| 1 | 0.05 | 2 | 8 | 0.01 | TPAOH | 0.05 | TPAOH |
| 2 | 0.05 | 1 | 13 | 0.02 | TPAOH | 0.05 | TPAOH |
| 3 | 0.15 | 9 | 20 | 0.05 | TPAOH | 0.15 | TPAOH |
| 4 | 0.25 | 4 | 6 | 0.07 | TPAOH | 0.25 | TPAOH |
| 5 | 0.36 | 0.1 | 30 | 0.02 | TPAOH | 0.36 | TPAOH |
| 6 | 0.5 | 1 | 50 | 0.1 | TPAOH | 0.5 | TPAOH |
| 7 | 0.25 | 4 | 6 | 0.07 | TPAOH | 0.1 | TPAOH |
| 8 | 0.16 | 2 | 18 | 0.03 | tetrabutylammonium hydroxide | 0.16 | tetrabutylammonium hydroxide |
| 9 | 0.16 | 2 | 18 | 0.03 | tetraethylammonium hydroxide | 0.16 | tetraethylammonium hydroxide |
| C1 | 0.22 | 0 | 11 | 0 | TPAOH | 0.22 | TPAOH |
| C2 | 0.22 |  | 11 | 0 | TPAOH | 0.22 | TPAOH |
| C3 | 0.05 | 2 | 8 | — | TPAOH | 0.05 | TPAOH |
| C4 | 0.05 | 2 | 8 | — | TPAOH | 0.05 | TPAOH |
| C5 | 0.05 | 2 | 8 | 0.01 | TPAOH | 0.05 | TPAOH |
| 10 | 0.135 | 2 | 5 | 0.01 | TPABr | 0.045 | — |
| 11 | 0.1 | 1 | 13 | 0.02 | TPABr | 0.05 | — |
| 12 | 0.3 | 9 | 20 | 0.05 | TPABr | 0.15 | — |
| 13 | 0.45 | 4 | 6 | 0.07 | TPABr | 0.25 | — |
| 14 | 0.46 | 0.1 | 30 | 0.02 | TPABr | 0.36 | — |
| 15 | 0.55 | 1 | 50 | 0.1 | TPABr | 0.5 | — |
| 16 | 0.4 | 4 | 6 | 0.07 | TPACl | 0.25 | — |
| 17 | 0.44 | 2 | 18 | 0.03 | TBABr | 0.16 | — |
| 18 | 0.27 | 2 | 18 | 0.03 | TEABr | 0.16 | — |
| C6 | 0.4 | 2 | 5 | — | TPABr | 0.05 | — |
| C7 | 0.135 | 2 | 5 | — | TPABr | 0.045 | — |
| C8 | 0.11 | 2 | 5 | 0.01 | TPABr | 0.05 | — |
| 19 | 0.29 | 2 | 24 | 0.01 | TPAOH/TPABr = 5:1 | 0.06 | TPAOH |
| 20 | 0.25 | 1 | 13 | 0.02 | TPAOH | 0.2 | TPAOH |
| 21 | 0.42 | 9 | 6 | 0.05 | TPABr | 0.09 | — |
| 22 | 0.6 | 4 | 5 | 0.07 | TPAOH/TPACl = 1:3 | 0.3 | TPAOH |
| 23 | 0.12 | 0.1 | 30 | 0.02 | TPAOH/TEAOH = 1:0.3 | 0.05 | TPAOH/TEAOH = 1:0.3 |
| 24 | 0.42 | 1 | 50 | 0.1 | TPAOH/TEABr = 1:0.2 | 0.09 | TPAOH |
| 25 | 0.6 | 4 | 6 | 0.07 | TPABr/TEABr = 1:1 | 0.08 | — |
| 26 | 0.46 | 2 | 18 | 0.03 | TBAOH/TBABr = 1:1 | 0.11 | TBAOH |
| 27 | 0.44 | 2 | 18 | 0.03 | TEAOH/TEABr = 3:1 | 0.08 | TEAOH |
| C9 | 0.29 |  | 24 | 0 | TPAOH/TPABr = 5:1 | 0.06 | TPAOH |
| C10 | 0.29 |  | 24 | 0 | TPACl/TPABr = 1:1 | 0.06 | — |
| C11 | 0.29 | 2 | 24 | — | TPAOH/TEACl = 1:10 | 0.12 | TPAOH |
| C12 | 0.29 | 2 | 24 | — | TPACl | 0.26 | — |
| C13 | 0.29 | 2 | 24 | 0.01 | TPABr | 0.2 | — |

| Example | Organic quaternary ammonium base/total silicon source | Organic quaternary ammonium salt | Organic quaternary ammonium salt/total silicon source | Organic amine | Organic amine/ total silicon source | Long-chain alkyl ammonium compound | Long-chain alkyl ammonium compound/total silicon source |
|---|---|---|---|---|---|---|---|
| 1 | 0.05 | — | 0 | — | 0 | — | 0 |
| 2 | 0.05 | — | 0 | — | 0 | — | 0 |
| 3 | 0.15 | — | 0 | — | 0 | — | 0 |
| 4 | 0.25 | — | 0 | — | 0 | — | 0 |
| 5 | 0.36 | — | 0 | — | 0 | — | 0 |
| 6 | 0.5 | — | 0 | — | 0 | — | 0 |
| 7 | 0.1 | — | 0 | ethylamine | 0.15 | — | 0 |
| 8 | 0.16 | — | 0 | — | 0 | — | 0 |
| 9 | 0.16 | — | 0 | — | 0 | — | 0 |
| C1 | 0.22 | — | 0 | — | 0 | — | 0 |
| C2 | 0.22 | — | 0 | — | 0 | — | 0 |

TABLE 1-continued

| | | | | | | | |
|---|---|---|---|---|---|---|---|
| C3 | 0.05 | — | 0 | — | 0 | — | 0 |
| C4 | 0.05 | — | 0 | — | 0 | — | 0 |
| C5 | 0.05 | — | 0 | — | 0 | — | 0 |
| 10 | 0 | TPABr | 0.045 | ethylene diamine | 0.09 | — | 0 |
| 11 | 0 | TPABr | 0.05 | triethylamine | 0.05 | — | 0 |
| 12 | 0 | TPABr | 0.15 | monomethanol amine | 0.15 | — | 0 |
| 13 | 0 | TPABr | 0.25 | aniline | 0.2 | — | 0 |
| 14 | 0 | TPABr | 0.36 | triethanolamine | 0.1 | — | 0 |
| 15 | 0 | TPABr | 0.5 | ethylene diamine | 0.05 | — | 0 |
| 16 | 0 | TPACl | 0.25 | ethylamine | 0.15 | — | 0 |
| 17 | 0 | TBABr | 0.16 | n-butylamine | 0.28 | — | 0 |
| 18 | 0 | TEABr | 0.16 | amino toluene | 0.11 | — | 0 |
| C6 | 0 | TPABr | 0.05 | triethylamine | 0.35 | — | 0 |
| C7 | 0 | TPABr | 0.045 | ethylene diamine | 0.09 | — | 0 |
| C8 | 0 | TPABr | 0.05 | aniline | 0.06 | — | 0 |
| 19 | 0.05 | TPABr | 0.01 | ethylene diamine | 0.11 | cetyltrimethylammonium bromide | 0.12 |
| 20 | 0.2 | — | 0 | triethylamine | 0 | cetyltrimethylammonium hydroxide | 0.05 |
| 21 | 0 | TPABr | 0.09 | monomethanol amine | 0.13 | cetyltrimethylammonium bromide | 0.2 |
| 22 | 0.075 | TPACl | 0.3 | aniline | 0.05 | myristyltrimethylammonium bromide | 0.25 |
| 23 | 0.05 | — | 0 | triethanolamine | 0.01 | dodecyltrimethylammonium hydroxide | 0.06 |
| 24 | 0.075 | TEABr | 0.0125 | ethylene diamine | 0.01 | dodecyltrimethylammonium bromide | 0.42 |
| 25 | 0 | TPABr/TEABr = 1:1 | 0.08 | ethylamine | 0.36 | cetyltrimethylammonium hydroxide | 0.16 |
| 26 | 0.055 | TBABr | 0.055 | n-butylamine | 0.2 | cetyltrimethylammonium bromide | 0.15 |
| 27 | 0.06 | TEABr | 0.02 | amino toluene | 0.16 | myristyltrimethylammonium bromide | 0.2 |
| C9 | 0.05 | TPABr | 0.01 | hexamethylene diamine | 0.11 | dodecyltrimethylammonium hydroxide | 0.12 |
| C10 | 0 | TPACl/TPABr = 1:1 | 0.06 | ethylene diamine | 0.11 | myristyltrimethylammonium bromide | 0.12 |
| C11 | 0.01 | TEACl | 0.11 | triethylamine | 0.24 | dodecyltrimethylammonium hydroxide | 0.04 |
| C12 | 0 | TPACl | 0.26 | monomethanol amine | 3 | dodecyltrimethylammonium bromide | 0.1 |
| C13 | 0 | TPABr | 0.2 | aniline | 0.09 | cetyltrimethylammonium hydroxide | 0.19 |

TABLE 2

| Example | Step (1) Stirring Temperature/° C. | Step (1) Stirring time/hr | Step (2) Aging temperature/° C. | Step (2) Aging time/hr | Step (3) Crystallization Temperature/° C. | Step (3) Crystallization time/hr |
|---|---|---|---|---|---|---|
| 1 | 80 | 4 | 26 | 12 | 165 | 12 |
| 2 | 90 | 3 | 26 | 3 | 145 | 144 |
| 3 | 10 | 15 | 26 | 9 | 175 | 72 |
| 4 | 50 | 8 | 26 | 15 | 160 | 24 |
| 5 | 80 | 4 | 26 | 35 | 165 | 72 |
| 6 | 80 | 4 | 26 | 50 | 165 | 72 |
| 7 | 50 | 3 | 26 | 15 | 160 | 24 |
| 8 | 80 | 4 | 30 | 3 | 170 | 18 |
| 9 | 80 | 4 | 30 | 13 | 170 | 16 |
| C1 | — | — | — | — | 170 | 48 |
| C2 | — | — | — | — | 170 | 48 |
| C3 | 80 | 4 | 26 | 12 | 165 | 12 |
| C4 | 80 | 4 | — | — | 165 | 12 |
| C5 | 80 | 4 | — | — | 165 | 12 |
| 10 | 80 | 4 | 26 | 12 | 165 | 12 |
| 11 | 90 | 3 | 26 | 3 | 145 | 144 |
| 12 | 100 | 15 | 26 | 9 | 175 | 72 |
| 13 | 50 | 8 | 26 | 15 | 160 | 24 |
| 14 | 80 | 4 | 26 | 35 | 165 | 72 |
| 15 | 80 | 4 | 26 | 50 | 165 | 72 |
| 16 | 50 | 3 | 26 | 15 | 160 | 24 |
| 17 | 80 | 4 | 30 | 3 | 170 | 18 |
| 18 | 80 | 4 | 30 | 13 | 170 | 16 |
| C6 | 80 | 4 | 26 | 12 | 165 | 12 |
| C7 | 80 | 4 | | | 165 | 12 |
| C8 | 80 | 4 | 26 | 12 | 165 | 12 |

TABLE 2-continued

| Example | Step (1) Stirring Temperature/° C. | Step (1) Stirring time/hr | Step (2) Aging temperature/° C. | Step (2) Aging time/hr | Step (3) Crystallization Temperature/° C. | Step (3) Crystallization time/hr |
|---|---|---|---|---|---|---|
| 19 | 80 | 4 | 26 | 12 | 165 | 12 |
| 20 | 90 | 3 | 26 | 3 | 145 | 144 |
| 21 | 10 | 15 | 26 | 9 | 175 | 72 |
| 22 | 50 | 8 | 26 | 15 | 160 | 24 |
| 23 | 80 | 4 | 26 | 35 | 165 | 72 |
| 24 | 80 | 4 | 26 | 50 | 165 | 72 |
| 25 | 50 | 3 | 26 | 15 | 160 | 24 |
| 26 | 80 | 4 | 30 | 3 | 170 | 18 |
| 27 | 80 | 4 | 30 | 13 | 170 | 16 |
| C9 | — | — | — | — | 170 | 48 |
| C10 | — | — | — | — | 170 | 48 |
| C11 | 80 | 4 | 26 | 12 | 165 | 12 |
| C12 | — | — | — | — | 165 | 12 |
| C13 | 80 | 4 | — | — | 165 | 12 |

TABLE 3

| Example | Step (3) $Q^4/Q^3$ | Step (3) Crystal grain size/nm | Step (3) cyclo-hexanone oxime conversion % | Step (3) caprolactam selectivity/% | Step (3) micropore volume | Step (3) mesopore volume | Step (4) $Q^4/Q^3$ | Step (4) Crystal grain size/nm | Step (4) cyclo-hexanone oxime conversion % | Step (4) caprolactam selectivity/% | Step (4) micropore volume | Step (4) mesopore volume |
|---|---|---|---|---|---|---|---|---|---|---|---|---|
| 1 | 16.07 | 279 | 97.1 | 97.94 | | | 19.28 | 264 | 98.7 | 98.92 | | |
| 2 | 18.49 | 321 | 95.9 | 94.97 | | | 22.19 | 287 | 94.5 | 95.92 | | |
| 3 | 16.99 | 295 | 95.5 | 96.43 | | | 20.39 | 261 | 97.1 | 97.4 | | |
| 4 | 17.51 | 304 | 95.6 | 96.53 | | | 21.01 | 289 | 96.2 | 97.49 | | |
| 5 | 26.32 | 457 | 91.9 | 92.34 | | | 31.58 | 434 | 92.5 | 93.26 | | |
| 6 | 19.7 | 342 | 92.6 | 97.47 | | | 23.64 | 325 | 93.65 | 98.1 | | |
| 7 | 17.51 | 304 | 96.7 | 95.31 | | | 21.01 | 289 | 98.2 | 98.44 | | |
| 8 | 21.14 | 367 | 96.4 | 89.31 | | | 25.37 | 349 | 97.31 | 97.54 | | |
| 9 | 29.16 | 159 | 97.5 | 96.24 | | | 34.99 | 151 | 94.28 | 95.21 | | |
| C1 | 97.29 | 351 | 91.1 | 93.65 | | | 100.31 | 318 | 92.5 | 97.52 | | |
| C2 | 100.2 | 586 | 89.2 | 91.77 | | | 114.24 | 557 | 89.3 | 89.56 | | |
| C3 | 98.36 | 527 | 80.7 | 90.98 | | | 106.43 | 501 | 83.8 | 92.35 | | |
| C4 | 96.15 | 697 | 51.3 | 92.27 | | | 98.18 | 662 | 54.7 | 93.51 | | |
| C5 | 114.6 | 740 | 40.8 | 93.13 | | | 116.16 | 703 | 45.1 | 94.05 | | |
| 10 | 16 | 281.9 | 99.2 | 97.8 | | | 19.6 | 259.5 | 99.9 | 98.3 | | |
| 11 | 18.8 | 319.3 | 96.8 | 96.3 | | | 22.5 | 283.2 | 94.2 | 94.4 | | |
| 12 | 17.2 | 294.4 | 95.9 | 97.4 | | | 20.5 | 259.5 | 97 | 97 | | |
| 13 | 17.5 | 306.7 | 94.8 | 94.2 | | | 20.6 | 293 | 95.5 | 99.3 | | |
| 14 | 26.4 | 452.4 | 92 | 91.5 | | | 32.1 | 438.9 | 93.8 | 93.7 | | |
| 15 | 19.3 | 334.8 | 92.6 | 96.6 | | | 24.1 | 327.9 | 93.9 | 97.1 | | |
| 16 | 17.5 | 310.2 | 97.5 | 94.2 | | | 21.5 | 288.6 | 96.2 | 99 | | |
| 17 | 21.2 | 374 | 95.7 | 89.3 | | | 25.6 | 351.8 | 95.9 | 96.3 | | |
| 18 | 28.8 | 160 | 97.2 | 98.6 | | | 35.8 | 153.4 | 94.3 | 94.3 | | |
| C6 | 99 | 517.1 | 80.1 | 89.4 | | | 104.7 | 507.2 | 85 | 93.4 | | |
| C7 | 97.6 | 694 | 51.5 | 91.6 | | | 97.9 | 668.6 | 55.2 | 93.8 | | |
| C8 | 113.2 | 756.5 | 40.9 | 91.5 | | | 117.7 | 694 | 45.2 | 95 | | |
| 19 | 16.2 | 275.9 | 98.2 | 98.8 | 0.175 | 0.423 | 19.4 | 259 | 98.4 | 99.9 | 0.172 | 0.478 |
| 20 | 18.9 | 319.4 | 97 | 93.5 | 0.169 | 0.415 | 21.9 | 281 | 92.9 | 96.2 | 0.166 | 0.469 |
| 21 | 16.6 | 296.9 | 97.4 | 97 | 0.162 | 0.438 | 20.6 | 260 | 99 | 95 | 0.159 | 0.495 |
| 22 | 17.6 | 309 | 95.8 | 96.1 | 0.171 | 0.436 | 20.9 | 290.9 | 94 | 97.1 | 0.168 | 0.493 |
| 23 | 26.3 | 447 | 94.2 | 93.4 | 0.163 | 0.417 | 31 | 431.5 | 92.7 | 94.8 | 0.16 | 0.471 |
| 24 | 19.6 | 348.8 | 94 | 97.5 | 0.168 | 0.452 | 23.5 | 324.5 | 92.9 | 98.1 | 0.165 | 0.511 |
| 25 | 17.7 | 311 | 95 | 93.2 | 0.163 | 0.429 | 21.4 | 294.6 | 98.3 | 99 | 0.16 | 0.485 |
| 26 | 21.4 | 359.3 | 97.3 | 90.1 | 0.154 | 0.411 | 25.4 | 349 | 97.2 | 98.1 | 0.151 | 0.464 |
| 27 | 29.9 | 160.1 | 95.2 | 96.9 | 0.189 | 0.561 | 35.8 | 147.6 | 92 | 92.8 | 0.185 | 0.634 |
| C9 | 97.9 | 348.4 | 89.1 | 95.9 | 0.165 | 0.17 | 98.8 | 313 | 92.1 | 99.3 | 0.162 | 0.192 |
| C10 | 98 | 598.9 | 89.2 | 93 | 0.164 | 0.168 | 116.4 | 543.5 | 89.8 | 87.9 | 0.161 | 0.19 |
| C11 | 98.4 | 540.2 | 81.4 | 91.4 | 0.164 | 0.161 | 105.6 | 507.2 | 84.7 | 93.9 | 0.161 | 0.182 |
| C12 | 96.1 | 685.8 | 50.5 | 94.1 | 0.167 | 0.158 | 96.5 | 650.6 | 53.3 | 92.1 | 0.164 | 0.179 |
| C13 | 114.3 | 753.9 | 40.9 | 93.9 | 0.166 | 0.164 | 115 | 695.5 | 44 | 92.7 | 0.163 | 0.185 |

We claim:

1. A full-Si molecular sieve having a $Q^4/Q^3$ of (10-90):1, wherein $Q^4$ is the peak strength at the chemical shift of $-112\pm2$ ppm in the $^{29}$Si NMR spectrum of the full-Si molecular sieve, expressed as the peak height relative to the base line; and
$Q^3$ is the peak strength at the chemical shift of $-103\pm2$ ppm in the $^{29}$Si NMR spectrum of the full-Si molecular sieve, expressed as the peak height relative to the base line.

2. The full-Si molecular sieve of claim 1, wherein the $Q^4/Q^3$ is in a range of (10-70):1.

3. The full-Si molecular sieve of claim 1, wherein a particle of the full-Si molecular sieve is a single crystal grain or an aggregate of multiple crystal grains, wherein the crystal grain has a size of 200 nm to 2 μm.

4. The full-Si molecular sieve of claim 3, wherein the crystal grain of the full-Si molecular sieve has a hollow structure, with a radial length of 5-300 nm for the cavity portion of the hollow grain, wherein an adsorption capacity of benzene of the molecular sieve measured under the conditions of 25° C., P/P0=0.10 and 1 hour of adsorption time is at least 70 mg/g.

5. The full-Si molecular sieve of claim 1, wherein the full-Si molecular sieve is a S-1 molecular sieve, a S-2 molecular sieve, or a β molecular sieve.

6. The full-Si molecular sieve of claim 1, wherein the full-Si molecular sieve has micropores with a pore diameter of less than 1 nm and mesopores with a pore diameter of 2-8 nm, a volume of mesopores having a pore diameter of 2-8 nm is 0.3-0.8 mL/g, and a volume of micropores having a pore diameter less than 1 nm is 0.12-0.19 mL/g.

7. The full-Si molecular sieve of claim 6, wherein (the volume of mesopores with a pore diameter of 2-8 nm)/(the volume of mesopores with a pore diameter of 2-8 nm plus the volume of micropores with a pore diameter of less than 1 nm) is in a numerical range of 0.6 to 0.8.

8. The full-Si molecular sieve of claim 6, wherein (the volume of mesopores with a pore diameter of 2-8 nm)/(the volume of mesopores with a pore diameter of 2-8 nm plus the volume of micropores with a pore diameter of less than 1 nm) is in a numerical range of 0.7 to 0.75.

9. A process for producing caprolactam by rearranging cyclohexanone oxime, comprising the step of contacting cyclohexanone oxime with the full-Si molecular sieve according to claim 1.

10. The full-Si molecular sieve of claim 1, wherein the $Q^4/Q^3$ is in the numerical range of (16-36):1.

11. A process for synthesizing a full-Si molecular sieve, comprising:
(1) mixing a template agent, an organic silicon source, water and an inorganic amine source to form a mixture, subjecting the mixture to hydrolyzation, and removing alcohols from the mixture;
(2) aging a product obtained in the step (1) 15-50° C.; and
(3) subjecting a mixture of the aged product obtained in the step (2) and a solid silicon source to crystallization to obtain a crystalline material.

12. The process of claim 11, wherein the template agent is selected from the group consisting of an organic quaternary ammonium base, an organic amine, an organic quaternary ammonium salt, a long-chain alkyl ammonium compound, and mixtures thereof.

13. The process of claim 12, wherein the organic quaternary ammonium base is selected from the group consisting of tetrapropylammonium hydroxide, tetrabutylammonium hydroxide, tetraethylammonium hydroxide, and mixtures thereof;
the organic amine is selected from the group consisting of aliphatic amine, aromatic amine, alcoholic amine, and mixtures thereof,
wherein the aliphatic amine has a general formula of $R^3(NH_2)_n$, wherein $R^3$ is $C_{1-4}$alkyl or $C_{1-4}$alkylene, n is 1 or 2,
the alcoholic amine can have a general formula of $(HOR^4)_mNH_{(3-m)}$, wherein $R^4$ is $C_1$-$C_4$alkyl, m is 1, 2, or 3, and
the aromatic amine is selected from the group consisting of aniline, amino toluene, p-phenylene diamine, and mixtures thereof;
the organic quaternary ammonium salt is selected from the group consisting of tetrapropylammonium bromide, tetrabutylammonium bromide, tetraethylammonium bromide, tetrapropylammonium chloride, tetrabutylammonium chloride, tetraethylammonium chloride, and mixtures thereof;
the long-chain alkyl ammonium compound has a formula of $R^5NH_3X$ or $R^5N(R^6)_3X$, wherein $R^5$ is a $C_{12}$-$C_{18}$ alkyl, $R^6$ is a $C_1$-$C_6$ (e.g. $C_1$-$C_4$)alkyl, wherein three $R^6$s in $R^5N(R^6)_3X$ are identical or not and X is a monovalent anion.

14. The method of claim 13, wherein the aliphatic amine is selected from the group consisting of ethylamine, n-butylamine, butylene diamine, hexamethylene diamine, and mixtures thereof,
the alcoholic amine is selected from the group consisting of monoethanolamine, diethanolamine, triethanolamine, and mixtures thereof, and
the long-chain alkyl ammonium compound is selected from the group consisting of a long-chain alkyl trimethyl ammonium chloride, a long-chain alkyl trimethyl ammonium bromide, a long-chain alkyl trimethyl ammonium hydroxide, cetyltrimethylammonium bromide, cetyltrimethylammonium chloride, cetyltrimethylammonium hydroxide, myristyltrimethylammonium bromide, myristyltrimethylammonium chloride, myristyltrimethylammonium hydroxide, dodecyltrimethylammonium bromide, dodecyltrimethylammonium chloride, dodecyltrimethylammonium hydroxide, octadecyltrimethylammonium bromide, octadecyltrimethylammonium chloride, octadecyltrimethylammonium hydroxide, and mixtures thereof.

15. The process of claim 12, wherein a molar ratio of the template agent to a total silicon source is selected from one or more of the following values:
a molar ratio of the organic quaternary ammonium base to the total silicon source is (0.05-0.36):1,
a molar ratio of the organic amine to the total silicon source is (0-0.45):1,
a molar ratio of the organic quaternary ammonium salt to the total silicon source is (0-0.55):1, and
a molar ratio of the long-chain alkyl ammonium compound to the total silicon source is (0.04-0.45):1,
wherein the total silicon source is a sum of the organic silicon source and the solid silicate source.

16. The process of claim 11, wherein
a molar ratio of the template agent to the total silicon source is (0.04-0.60):1;
a molar ratio of water to the total silicon source is (3-100):1;
a molar ratio of the inorganic amine source (as $NH_4^+$) to the total silicon source is (0.01-0.1):1; and
a weight ratio of the aged product to the solid silicon source, calculated based on the weight of $SiO_2$, is 1:(0.1-10), and
wherein the total silicon source is a sum of the organic silicon source and the solid silicate source.

17. The process of claim 11, wherein the aging in the step (2) lasts for 1-60 hours.

18. The process of claim 11, wherein in the step (3), the crystallization is carried out at 110° C. to 200° C. under an autogenous pressure for 2 hours to 20 days.

19. The process of claim 11, wherein in the step (1), the template agent comprises an organic quaternary ammonium base, optionally an organic amine, and optionally an organic quaternary ammonium salt,
wherein a molar ratio of the organic quaternary ammonium base to a total silicon source is (0.05-0.36):1, a molar ratio of the organic amine to the total silicon source is (0-0.45):1 and a molar ratio of the organic quaternary ammonium salt to the total silicon source is (0-0.45):1,
wherein the total silicon source is a sum of the organic silicon source and the solid silicate source.

20. The process of claim 11, wherein in the step (1), the template agent is a mixture of an organic quaternary ammonium salt and an organic amine, wherein a molar ratio of the organic quaternary ammonium salt to a total silicon source is (0.04-0.55):1, and a molar ratio of the organic amine to the total silicon source is (0.04-0.45):1, wherein the total silicon source is a sum of the organic silicon source and the solid silicate source.

21. The process of claim 11, wherein in the step (1), the template agent is a mixture of an organic quaternary ammonium salt and an organic amine, wherein a molar ratio of the organic quaternary ammonium salt to a total silicon source is (0.05-0.30):1, and a molar ratio of the organic amine to the total silicon source is (0.05-0.35):1, wherein the total silicon source is a sum of the organic silicon source and the solid silicate source.

22. The process of claim 11, wherein in the step (1), the template agent is a mixture of a quaternary ammonium source, an long-chain alkyl ammonium compound, and an optional organic amine,
wherein the quaternary ammonium source is an organic quaternary ammonium base, an organic quaternary ammonium salt, or a mixture thereof,
wherein a molar ratio of the quaternary ammonium source to a total silicon source is (0.04-0.45):1, a molar ratio of the long-chain alkyl ammonium compound to the total silicon source is (0.04-0.45):1, and a molar ratio of the organic amine to the total silicon source is (0-0.40):1, and
wherein the total silicon source is a sum of the organic silicon source and the solid silicate source.

23. The process of claim 22, wherein in the step (1), the molar ratio of the quaternary ammonium source to the total silicon source is (0.05-0.30):1, and the molar ratio of the long-chain alkyl ammonium compound to the total silicon source is (0.05-0.30): 1.

24. The process of claim 23, wherein in the step (1), the molar ratio of the quaternary ammonium source to the total silicon source is (0.05-0.20):1, the molar ratio of the organic amine to the total silicon source is (0.05-0.25):1, and the molar ratio of the long-chain alkyl ammonium compound to the total silicon source is (0.05-0.25):1.

25. The process of claim 11, wherein the full-Si molecular sieve is a S-1 molecular sieve, and the template agent is selected from the group consisting of tetrapropylammonium hydroxide, tetrapropylammonium chloride, tetrapropylammonium bromide, an organic amine, a long-chain alkyl ammonium compound, and mixtures thereof; or
the full-Si molecular sieve is a S-2 molecular sieve, and the template agent is selected from the group consisting of tetrabutylammonium hydroxide, tetrabutylammonium chloride, tetrabutylammonium bromide, an organic amine, a long-chain alkyl ammonium compound, and mixtures thereof; or
the full-Si molecular sieve is a β molecular sieve, and the template agent is selected from the group consisting of tetraethylammonium hydroxide, tetraethylammonium chloride, tetrapropylammonium bromide, an organic amine, a long-chain alkyl ammonium compound, and mixtures thereof.

26. The process of claim 11, wherein said process further comprises:

(4): recrystallizing the crystalline material obtain in the step (3) in an aqueous solution containing an organic base at a temperature range of 100° C. to 200° C. for a duration of 0.1 day to 10 days, and
wherein a molar ratio of the crystalline material obtained in the step (3) to the organic base is 1: (0.02-0.5) and a molar ratio of the crystalline material obtained in the step (3) to water in the aqueous solution is 1: (2-50).

27. The process of claim 11, wherein the solid silicon source is carbon white having a specific surface area of 50-400 $m^2/g$.

28. The process of claim 11, wherein a molar ratio of the template agent to a total silicon source (as $SiO_2$) is in a numerical range of (0.08-0.60):1.

29. The process of claim 11, wherein a molar ratio of the inorganic amine source (as $NH_4^+$) to the total silicon source (as $SiO_2$) is in a numerical range of (0.01-0.1):1.

30. The process of claim 11, wherein the molar ratio of water to the total silicon source (as $SiO_2$) is in a numerical range of (3-100):1.

31. The process of claim 11, wherein the weight ratio of the aged product (as $SiO_2$) to the solid silicon source (as $SiO_2$) is 1:(1-9).

32. The process of claim 11, wherein in the step (1), the time for hydrolyzation and removing alcohols is at least 10 minutes.

33. The process of claim 11, wherein, in the step (1), hydrolyzation is carry out in a temperature range of 0° C. to 150° C.

34. The process of claim 11, wherein, in the mixture obtained in the step (1), the weight content of alcohols produced by hydrolyzation is not higher than 10 ppm.

35. The process of claim 11, wherein, in the step (2), the aging time is in a duration of 1 hour to 60 hours.

36. The process of claim 11, wherein, in the step (2), the aging temperature is in a temperature range of room temperature to 50° C.

37. The process of claim 11, wherein, in the step (3), the crystallization temperature is in a temperature range of 110° C. to 200° C.

38. The process of claim 11, wherein, in the step (3), the crystallization time is in a duration of 2 hours to 20 days.

39. The process of claim 11, wherein, in the step (3), the crystallization is carried out under an autogenous pressure.

40. The process of claim 11, wherein, in the step (3), the crystallization is carried out at 100° C. to 130° C. for 0.5 day to 1.5 days, and then at 160° C. to 180° C. for 1 day to 3 days, under an autogenous pressure.

41. The process of claim 11, wherein the organic silicate is selected from the group consisting of tetramethyl orthosilicate, tetraethyl orthosilicate, tetrabutyl orthosilicate, dimethyl diethyl orthosilicateone, and mixtures thereof.

42. The process of claim 11, wherein the organic silicon source is an organic silicate having general formula of $Si(OR^1)_4$, and $R^1$ is a linear or a branched $C_1$-$C_6$ alkyl,
the solid silicon source is a high purity silica particle or powder, on a dry basis and by weight, the solid silicon source has a $SiO_2$ content of more than 99.99 wt %, a total content by atom of Fe, Al and Na of less than 10 ppm, and
the inorganic amine source is an inorganic ammonium salt, an aqueous ammonia, or a combination thereof.

43. The process of claim 11, wherein said process further comprises:
(4): recrystallizing the crystalline material obtain in the step (3) in an aqueous solution containing an organic base at a temperature range of 120° C. to 200° C. for a duration of 1 day to 6 days, and wherein a molar ratio of the crystalline material obtained in the step (3) to the organic base is 1: (0.02-0.5) and a molar ratio of the crystalline material obtained in the step (3) to water in the aqueous solution is 1: (2-50).

44. The process of claim 11, wherein a molar ratio of the template agent to a total silicon source (as $SiO_2$) is in the numerical range of (0.10-0.55):1.

45. The process of claim 11, wherein a molar ratio of the inorganic amine source (as $NH_4^+$) to the total silicon source (as $SiO_2$) is in a numerical range of (0.01-0.07): 1.

46. The process of claim 11, wherein a molar ratio of water to the total silicon source (as $SiO_2$) is in a numerical range of (6-50):1.

47. The process of claim 11, wherein, in the step (1), hydrolyzation is carried out in a temperature range of 50° C. to 95° C.

48. The process of claim 11, wherein, in the step (2), the aging time is in a duration of 2 hour to 50 hours.

49. The process of claim 11, wherein, in the step (2), the aging temperature is in a temperature range of 26° C. to 30° C.

50. The process of claim 11, wherein, in the step (3), the crystallization temperature is in a temperature range of 140° C. to 180° C.

51. The process of claim 11, wherein, in the step (3), the crystallization time is in a duration of 0.5 day to 6 days.

* * * * *